United States Patent
Umi

(10) Patent No.: US 10,200,553 B2
(45) Date of Patent: Feb. 5, 2019

(54) DOCUMENT CONVEYING APPARATUS

(71) Applicant: PFU LIMITED, Kahoku-shi, Ishikawa (JP)

(72) Inventor: Takayuki Umi, Kahoku (JP)

(73) Assignee: PFU LIMITED, Kahoku-Shi, Ishikawa (JP)

( * ) Notice: Subject to any disclaimer, the term of this patent is extended or adjusted under 35 U.S.C. 154(b) by 0 days.

(21) Appl. No.: 15/497,751

(22) Filed: Apr. 26, 2017

(65) Prior Publication Data
US 2018/0176399 A1    Jun. 21, 2018

(30) Foreign Application Priority Data

Dec. 19, 2016 (JP) ................................ 2016-245454

(51) Int. Cl.
*B65H 5/00* (2006.01)
*H04N 1/00* (2006.01)
(Continued)

(52) U.S. Cl.
CPC ........... *H04N 1/00602* (2013.01); *B65H 1/06* (2013.01); *B65H 3/06* (2013.01); *B65H 5/06* (2013.01);
(Continued)

(58) Field of Classification Search
CPC .. B65H 2301/42322; B65H 2404/1344; B65H 2404/1345; B65H 2404/411;
(Continued)

(56) References Cited

U.S. PATENT DOCUMENTS

| | | | |
|---|---|---|---|
| 3,761,079 A * | 9/1973 | Azure, Jr. | G06K 13/10 271/10.03 |
| 6,345,760 B1 * | 2/2002 | Eason | B65H 1/06 235/380 |

(Continued)

FOREIGN PATENT DOCUMENTS

| | | |
|---|---|---|
| JP | 60-9842 U | 1/1985 |
| JP | 05-186071 A | 7/1993 |

(Continued)

OTHER PUBLICATIONS

Japanese Office Action dated Dec. 5, 2017 regarding Japanese Patent Application No. 2016-245454 corresponding to U.S. Pat. No. 15/497,751 (3 pages) with English Translation (3 pages).
(Continued)

*Primary Examiner* — Howard J Sanders
(74) *Attorney, Agent, or Firm* — Lewis Roca Rothgerber Christie LLP

(57) ABSTRACT

A document conveying apparatus includes a first conveying roller for conveying a document stacked on the document tray, a second conveying roller, provided at a downstream side with respect to the first conveying roller, for conveying a document stacked on the document tray, a separation roller, provided at a downstream side with respect to the second conveying roller, for performing separation operation of the document, a driving force transmission mechanism for transmitting the driving force to a driving shaft of the first conveying roller, a driving shaft of the second conveying roller, and a driving shaft of the separation roller, and a first blocking mechanism, provided between the first conveying roller and the driving shaft of the first conveying roller, for blocking a driving force transmitted to the driving shaft of the first conveying roller, for a first certain period of time.

7 Claims, 16 Drawing Sheets

(51) Int. Cl.
*B65H 1/06* (2006.01)
*B65H 3/06* (2006.01)
*B65H 5/06* (2006.01)
*B65H 3/52* (2006.01)

(52) U.S. Cl.
CPC ........... *H04N 1/00615* (2013.01); *B65H 3/52* (2013.01); *B65H 2301/42322* (2013.01); *B65H 2404/411* (2013.01); *B65H 2801/39* (2013.01)

(58) Field of Classification Search
CPC .. B65H 2403/514; B65H 1/06; B65H 3/5276; B65H 3/523; B65H 3/52
See application file for complete search history.

(56) References Cited

U.S. PATENT DOCUMENTS

| | | | |
|---|---|---|---|
| 8,511,671 B2 * | 8/2013 | Takiguchi | B65H 3/0607 271/114 |
| 2007/0080492 A1 | 4/2007 | Suzuki et al. | |
| 2016/0347562 A1 * | 12/2016 | Anzai | B65H 7/18 |

FOREIGN PATENT DOCUMENTS

| | | |
|---|---|---|
| JP | 07-053069 A | 2/1995 |
| JP | 2005-170651 A | 6/2005 |

OTHER PUBLICATIONS

Japanese Office Action dated Sep. 5, 2017 for Japanese Patent Application No. 2016-245454 (2 pages) with English translation (3 pages).

* cited by examiner

ROLLER SPEED=S1
AXIAL SPEED=S1

FIG. 11

| STANDARD SIZES | LENGTH[mm] |
|---|---|
| HEIGHT OF TABLOID/LEDGER (ANSI B) | 432 |
| HEIGHT OF A3/WIDTH OF A2 | 420 |
| HEIGHT OF B4/WIDTH OF B3 | 364 |
| HEIGHT OF LEGAL SIZE | 356 |
| HEIGHT OF A4/WIDTH OF A3 | 297 |
| HEIGHT OF LETTER SIZE (ANSI A) | 279 |
| HEIGHT OF B5/WIDTH OF B4 | 257 |
| WIDTH OF LETTER SIZE (ANSI A) | 216 |
| HEIGHT OF A5/WIDTH OF A4 | 210 |
| HEIGHT OF B6/WIDTH OF B5 | 182 |
| HEIGHT OF A6/WIDTH OF A5 | 148 |
| HEIGHT OF B7/WIDTH OF B6 | 128 |
| HEIGHT OF A7/WIDTH OF A6 | 105 |
| HEIGHT OF B8/WIDTH OF B7 | 91 |
| HEIGHT OF A8/WIDTH OF A7 | 74 |
| ... | ... |

DOCUMENT CONVEYING APPARATUS

CROSS-REFERENCE TO RELATED APPLICATIONS

This application is based upon and claims the benefit of priority of prior Japanese Patent Application No. 2016-245454, filed on Dec. 19, 2016, the entire contents of which are incorporated herein by reference.

TECHNICAL FIELD

Embodiments discussed in the present specification relate to document conveying technology.

BACKGROUND

A document conveying apparatuses such as a scanner are used for various purposes in various locations such as households and offices, and various types of document conveying apparatuses have been provided in accordance with the purposes. For example, in offices etc., in order to allow more documents to be conveyed at a time, a so-called document conveying apparatus of a lower side retrieval method is used. In the document conveying apparatus of the lower side retrieval method, a document stacking angle of a document tray for stacking documents is almost horizontal, and documents stacked at a lower position are conveyed in order by a conveying roller provided in the document tray.

A feeding apparatus of a lower side retrieval type having a pick roller disposed at a central portion of a sheet stacking table and an apparatus main body side end portion of the sheet stacking table is disclosed (see Japanese Laid-open Patent Publication No. 2005-170651).

SUMMARY

When multiple conveying rollers are provided on an upstream side in a document conveying direction with respect to a separation roller for separating a document in a document conveying apparatus of a lower side retrieval method, the document can be conveyed in a preferable manner even if many documents are stacked on a document tray. In the document conveying apparatus, each roller is driven by a driving force generation module such as a motor, and it is desirable to drive each roller with a single driving force generation module in order to suppress an increase in the electric power consumption. However, when each roller is driven by a single driving force generation module, it is necessary to properly control the rotation of each roller so that a jam of the document does not occur.

It is an object to provide a document conveying apparatus driving a separation roller and multiple conveying rollers for conveying a document stacked on a document tray with a single driving force generation module, wherein the rotation of each roller can be properly controlled.

According to an aspect of the apparatus, there is provided a document conveying apparatus. The document conveying apparatus includes a document tray, a driving module for generating a driving force, a first conveying roller for conveying a document stacked at a lowermost position, which is one of documents stacked on the document tray, a second conveying roller, provided at a downstream side with respect to the first conveying roller in a document conveying direction, for conveying a document stacked at a lowermost position, which is one of documents stacked on the document tray, a separation roller, provided at a downstream side with respect to the second conveying roller in the document conveying direction, for performing separation operation of the document, a driving force transmission mechanism for transmitting the driving force to a driving shaft of the first conveying roller, a driving shaft of the second conveying roller, and a driving shaft of the separation roller, and a first blocking mechanism, provided between the first conveying roller and the driving shaft of the first conveying roller, for blocking a driving force transmitted to the driving shaft of the first conveying roller so that the driving force is not transmitted to the first conveying roller, for a first certain period of time since a rear edge of the document conveyed by the first conveying roller passes the first conveying roller.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 5B is a diagram for explaining a structure of a pick roller 111a.

FIG. 11 is a table illustrating a list of standard sizes of paper.

DESCRIPTION OF EMBODIMENTS

Hereinafter, a document conveying apparatus according to an embodiment, will be described with reference to the drawings. However, note that the technical scope of the invention is not limited to these embodiments and extends to the inventions described in the claims and their equivalents.

Figure 1:
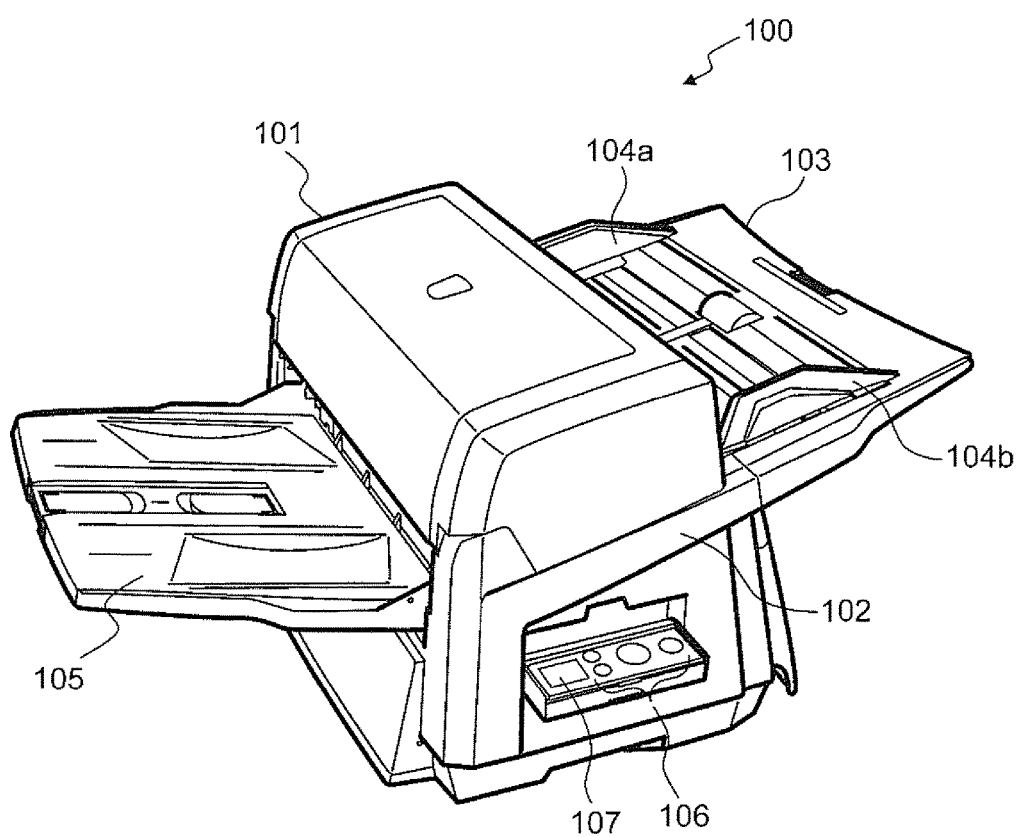
FIG. 1 is a perspective view illustrating a document conveying apparatus 100.

FIG. 1 is perspective view illustrating a document conveying apparatus 100 configured as an image scanner according to an embodiment.

The document conveying apparatus 100 includes an upper side housing 101, a lower side housing 102, a document tray 103, a discharged sheet stacker 105, multiple operation buttons 106, a display device 107, etc.

The upper side housing 101 is arranged at a position to cover the upper surface of the document conveying apparatus 100, and is attached to the lower side housing 102 with a hinge so as to be able to open and close, at the time of a paper jam, at the time of cleaning of the document conveying apparatus 100, etc.

The document tray 103 is engaged with the lower side housing 102 in such a manner that the document can be placed on the document tray 103. The document tray 103 is provided with side guides 104a and 104b which can move in a direction perpendicular to the conveying direction of the document. Hereinafter, the side guides 104a and 104b may be collectively referred to as side guides 104.

The discharged sheet stacker 105 is attached to the lower side housing 102 in such a manner that the discharged sheet stacker 105 can hold the discharged documents.

The operation buttons 106 is arranged a side portion of the lower side housing 102, and when the operation button 106 is pressed down, the operation button 106 generates and outputs an operation detection signal in accordance with the button.

The display device 107 includes a display constituted by a liquid crystal, an organic EL (Electro-Luminescence), etc., and an interface circuit for outputting image data to the display, and displays the image data to the display.

Figure 2:
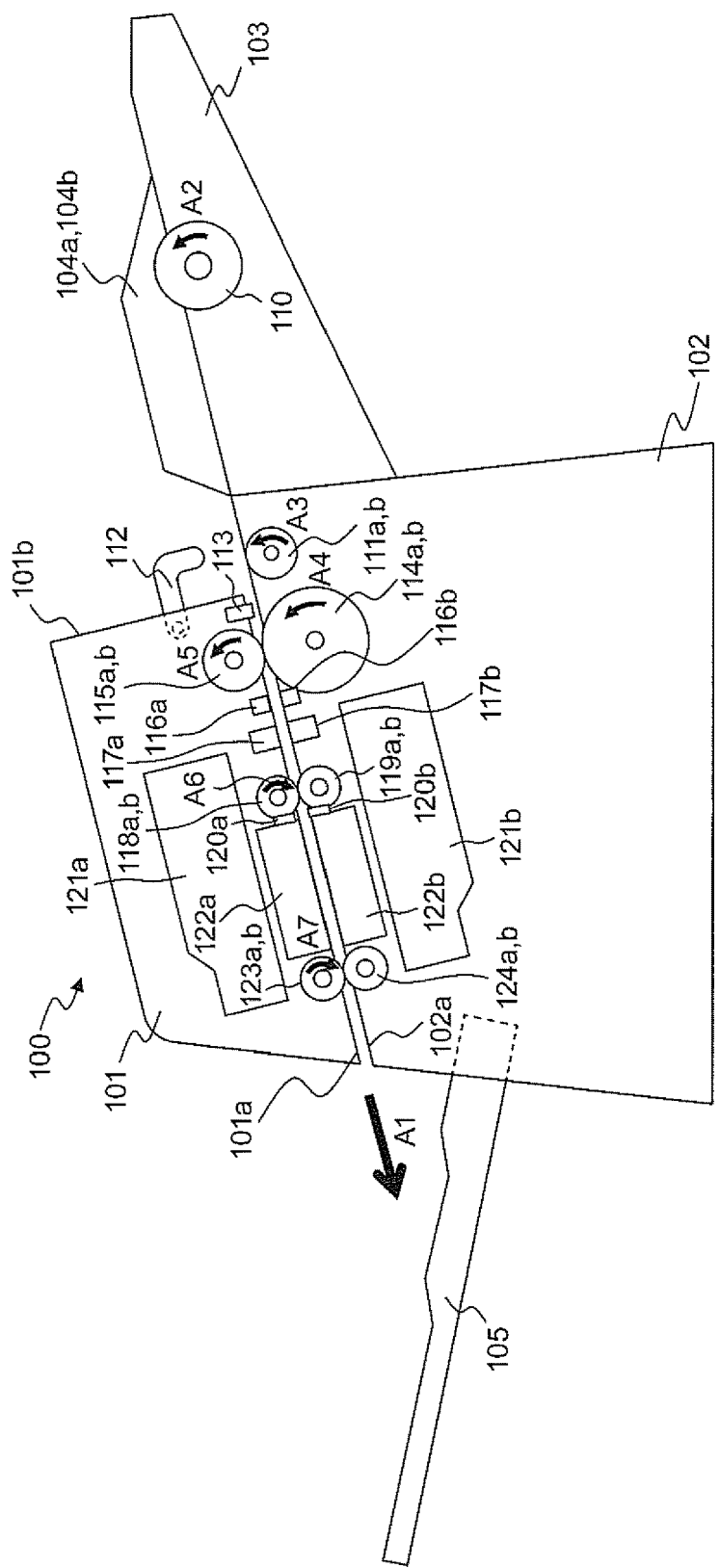
FIG. 2 is a figure for explaining a conveying path in the document conveying apparatus 100.

FIG. 2 is a figure for explaining a conveying path inside of the document conveying apparatus 100.

The conveying path inside of the document conveying apparatus 100 includes a shoot roller 110, a pick roller 111a, 111b, a pick arm 112, a contact sensor 113, feeding rollers 114a, 115b, retard rollers 115a, 115b, a first light emitter 116a, a first light receiver 116b, an ultrasonic transmitter 117a, an ultrasonic receiver 117b, first driving rollers 118a, 118b, first driven rollers 119a, 119b, a second light emitter 120a, a second light receiver 120b, a first image capturing device 121a, a second image capturing device 121b, a first illumination device 122a, a second illumination device 122b, second driving rollers 123a, 123b, second driven rollers 124a, 124b, etc.

In the following explanation, the pick roller 111a and 111b may be collectively referred to as the pick roller 111. The feeding rollers 114a and 114b may be collectively referred to as the feeding roller 114. The retard rollers 115a and 115b may be collectively referred to as the brake roller 115. The first driving rollers 118a and 118b may be collectively referred to as the first driving roller 118. The first driven rollers 119a and 119b may be collectively referred to as the first driven roller 119. The second driving rollers 123a and 123b may be collectively referred to as the second driving roller 123. The second driven rollers 124a and 124b may be collectively referred to as the second driven roller 124.

The lower surface of the upper side housing 101 forms a upper side guide 108a of the conveying route for the documents, and the upper surface of the lower side housing 102 forms an lower side guide 108b of the conveying route for the documents. In FIG. 2, arrow A1 indicates the conveying direction of the documents. In the following explanation, the upstream means the upstream in the conveying direction A1 of the documents, and the downstream means the downstream in the conveying direction A1 of the documents.

The shoot roller 110 is an example of a first conveying roller. The shoot roller 110 is provided in the document tray 103, and the shoot roller 110 is in contact with a document stacked at the lowermost position, which is one of the documents stacked on the document tray 103, so that the shoot roller 110 conveys the document in a document conveying direction A1. The shoot roller 110 is provided in such a manner that, when a document having the maximum size supported by the document conveying apparatus 100 is stacked on the document tray 103, the shoot roller 110 is provided at a position in proximity to the center of mass (center position) of the document, so that the document is reliably conveyed. A conveying speed S1 of the document by the shoot roller 110 is set to be slower (lower) than a conveying speed S3 of the document by the feeding roller 114.

The pick roller 111 is an example of a second conveying roller, and the pick roller 111 is provided at a downstream side with respect to the shoot roller 110 in the document conveying direction A1. The pick roller 111 is provided in the lower side housing 102. The pick roller 111 comes into contact with a document stacked at the lowermost position, which is one of the documents which are stacked on the document tray 103 and of which front edges are brought into abutment with an abutment module 101b of the upper side housing 101, and the pick roller 111 conveys the document in the document conveying direction A1. The conveying speed S2 of the document by the pick roller 111 is set so as to be faster (higher) than the conveying speed S1 of the document by the shoot roller 110 and slower (lower) than the conveying speed S3 of the document by the feeding roller 114. With the actions of the shoot roller 110 and the pick roller 111, the document conveying apparatus 100 causes the document to be conveyed with a so-called lower side retrieval method.

The pick arm 112 is provided on the upper side housing 101 in such a manner that the pick arm 112 is at a position facing the pick roller 111. The pick arm 112 pressurizes, from above, documents placed on the document tray 103 in such a manner that an appropriate frictional force is generated between the pick roller 111 and the documents placed on the document tray 103 to enable the pick roller 111 to convey the documents in a preferable manner.

The contact sensor 113 is disposed on the upstream side with respect to the feeding roller 114 and the retard roller 115, and is configured to detect whether or not the document is stacked on the document tray 103. The contact sensor 113 generates and outputs a first document detection signal whose signal value varies between a state in which the document is stacked on the document tray 103 and a state in which the document is not stacked.

The feeding roller 114 is an example of a separation roller, and is provided at a downstream side with respect to the pick roller 111 in the document conveying direction A1. The feeding roller 114 is provided in the lower side housing 102, and is configured to feed the document stacked on the document tray 103 in the document conveying direction A1. The retard roller 115 is provided in the upper side housing 101 at a position facing the feeding roller 114. The feeding roller 114 performs the separation operation for separating the documents by working together with the retard roller 115.

The first light emitter 116a and the first light receiver 116b are provided at the downstream side with respect to the feeding roller 114 and the retard roller 115 and at the upstream side with respect to the first driving roller 118 and the first driven roller 119, and are arranged to face each other with the conveying route for the documents interposed therebetween. The first light emitter 116a emits light to the first light receiver 116b. The first light receiver 116b detects light emitted from the first light emitter 116a, and generates and outputs a second document detection signal which is an electric signal according to the detected light. More specifically, the second document detection signal is a signal of which the value changes depending on a state in which a document exists between the first light emitter 116a and the first light receiver 116b and a state in which a document does not exist between the first light emitter 116a and the first light receiver 116b. Hereinafter, the first light emitter 116a and the first light receiver 116b may be collectively referred to as the first light sensor 116.

The ultrasonic transmitter 117a and the ultrasonic receiver 117b are arranged in proximity to the conveying route for the documents so as to face each other with the conveying route interposed therebetween. The ultrasonic transmitter 117a transmits an ultrasonic wave. On the other hand, the ultrasonic receiver 117b detects the ultrasonic wave that has been transmitted by the ultrasonic transmitter 117a and that has passed through a document, and generates and outputs an ultrasonic signal which is an electric signal according to the detected ultrasonic wave. In the following explanation, the ultrasonic transmitter 117a and the ultrasonic receiver 117b may be collectively referred to as the ultrasonic sensor 117.

The first driving roller 118 is an example of a third conveying roller. The first driving roller 118 is provided in the upper side housing 101 in such an arrangement that the driving roller 118 is provided on the downstream side with respect to the feeding roller 114 and the retard roller 115 in the document conveying direction A1 and on the upstream side with respect to the first image capturing device 121a. The first driven roller 119 is provided in the lower side housing 102 at a position facing the first driving roller 118.

The second light emitter 120a and the second light receiver 120b are disposed at a downstream side with respect to the first driving roller 118 and the first driven roller 119 and at an upstream side with respect to the imaging positions of the first image capturing device 121a and the second image capturing device 121b in such a manner that the second light emitter 120a and the second light receiver device 120b are disposed to face each other with a conveying path of a document interposed therebetween. The second light emitter 120a emits light to the second light receiver 120b. The second light receiver 120b detects light emitted from the second light emitter 120a, and generates and outputs a third document detection signal which is an electric signal according to the detected light. More specifically, the third document detection signal is a signal of which the value changes depending on a state in which a document exists between the second light emitter 120a and the second light receiver 120b and a state in which a document does not exist between the second light emitter 120a and the second light receiver 120b. Hereinafter, the second light emitter 120a and the second light receiver 120b may be collectively referred to as the second light sensor 120.

The first image capturing device 121a includes an image capturing sensor of a reduced optical system type having an image capturing device based on CCD (Charge Coupled Device) arranged in a linear manner in a main scanning direction. This image capturing sensor reads the back surface of the document, and generates and outputs an analog image signal. Likewise, the second image capturing device 121b includes an image capturing sensor of a reduced optical system type based on CCD arranged in the linear manner in the main scanning direction. This image capturing sensor generates and outputs an analog image signal by reading the front surface of the document. It should be noted that only one of the first image capturing device 121a and the second image capturing device 121b may be provided to read only one of the surfaces of a document. Alternatively, it may possible to use a CIS (Contact Image Sensor) of the same-size optical system type having an image capturing device based on CMOS (Complementary Metal Oxide Semiconductor) instead of the CCD. Hereinafter, the first image capturing device 121a and the second image capturing device 121b may be collectively referred to as the image capturing device 121.

The first illumination device 122a includes a light source for illuminating the back surface of a document and a backing that is used for the front surface of the document, and is arranged at a position between the first image capturing device 121a and the document conveying route so that the first illumination device 122a faces the second image capturing device 121b. Likewise, the second illumination device 122b includes a light source for illuminating the front surface of a document and a backing that is used for the back surface of the document, and is arranged at a position between the second image capturing device 121b and the document conveying route so that the second illumination device 122b faces the first image capturing device 121a. Hereinafter, the first illumination device 122a and the second illumination device 122b may be collectively referred to as the illumination device 122.

The second driving roller 123 is provided in the upper side housing 101 on the downstream side with respect to the first imaging apparatus 121a and the retard roller 115 in the document conveying direction A1. The second driven roller 124 is disposed in the lower side housing 102 at a position facing the second driving roller 123.

When the shoot roller 110, the pick roller 111, and the feeding roller 114 rotate, respectively, in the directions of the arrows A2, A3, A4 in FIG. 2, the documents stacked on the document tray 103 is conveyed between the upper side guide 101a and the lower side guide 102a toward the document conveying direction A1. On the other hand, when multiple documents are stacked on the document tray 103, the retard roller 115 rotates in the direction of the arrow A5, so that only the document in contact with the feeding roller 114 is separated from the documents stacked on the document tray 103.

While the document is guided by the upper side guide 101a and the lower side guide 102a, the document is fed between the first driving roller 118 and the first driven roller 119. When the first driving roller 118 rotates in the direction of the arrow A6, the document is fed between the first illumination device 122a and the second illumination device 122b (i.e., between the first image capturing device 121a and the second image capturing device 121b). The document read by the image capturing device 121 is discharged onto the discharged sheet stacker 105 when the second driving roller 123 rotates in the direction of the arrow A7.

Figure 3:
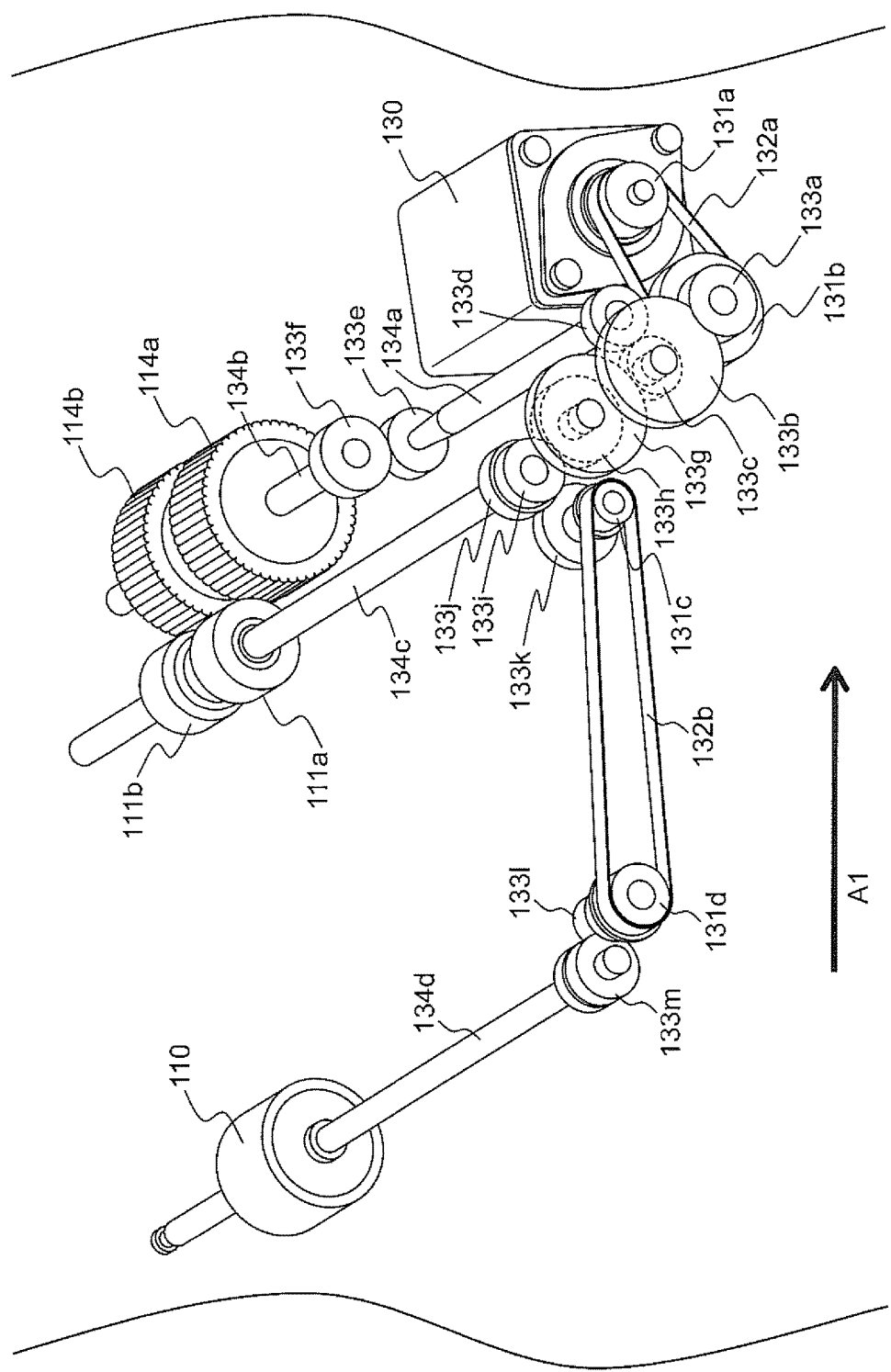
FIG. 3 is a diagram for explaining a driving force transmission mechanism.

FIG. 3 is a diagram for explaining a driving force transmission mechanism for the shoot roller 110, the pick roller 111, and the feeding roller 114.

As illustrated in FIG. 3, the document conveying apparatus 100 includes not only the shoot roller 110, the pick roller 111, and the feeding roller 114 explained above but also a first motor 130. The document conveying apparatus 100 includes first to fourth pulleys 131a to 131d, first and second belts 132a and 132b, first to thirteenth gears 133a to m, first to fourth shafts 134a to d, etc.

The first motor 130 is an example of a driving module. The first motor 130 generates a driving force to drive (rotate) the shoot roller 110, the pick roller 111, and the feeding roller 114, and performs the conveying operation of the document.

The first motor 130 has the first pulley 131a. The first belt 132a is stretched between the first pulley 131a and the second pulley 131b. The first gear 133a is attached to the second pulley 131b so as to rotate according to the rotation of the second pulley 131b, and the first gear 133a is engaged with the second gear 133b. The third gear 133c is attached to the second gear 133b so as to rotate according to the rotation of the second gear 133b, and the third gear 133c is engaged with the fourth gear 133d. The fourth gear 133d is attached to one end of the first shaft 134a, and the fifth gear 133e is attached to the other end of the first shaft 134a. The fifth gear 133e is engaged with the sixth gear 133f, and the sixth gear 133f is attached to one end of the second shaft 134b which is the driving shaft of the feeding roller 114.

The third gear 133c is also engaged with the seventh gear 133g. The eighth gear 133h is attached to the seventh gear 133g so as to rotate according to the rotation of the seventh gear 133g, and the eighth gear 133h is engaged with the ninth gear 133i. The ninth gear 133i is attached to one end of the third shaft 134c which is the driving shaft of the pick roller 111.

The tenth gear 133j is further attached to the side of the third shaft 134c to which the ninth gear 133i is attached, and the tenth gear 133j is engaged with the eleventh gear 133k. The third pulley 131c is attached to the eleventh gear 133k so as to rotate according to the rotation of the eleventh gear 133k, and the second belt 132b is stretched between the third pulley 131c and the fourth pulley 131d. The twelfth gear 133l is attached to the fourth pulley 131d so as to rotate according to the rotation of the fourth pulley 131d, and the twelfth gear 133l is engaged with the thirteenth gear 133m. The thirteenth gear 133m is attached to one end of the fourth shaft 134d which is the driving shaft of the shoot roller 110.

The first pulley 131a, the first belt 132a, the second pulley 131b, the first to fourth gears 133a to 133d, the first shaft 134a, the fifth to sixth gears 133e to 133f, and the second shaft 134b are rotated by the driving force provided by the first motor 130. As a result, the feeding roller 114 rotates. More specifically, the first to second pulleys 131a to 131b, the first belt 132a, the first to sixth gears 133a to 133f, and the first shaft 134a are a driving force transmission mechanism for transmitting the driving force from the first motor 130 to the second shaft 134b. The driving force transmission mechanism for transmitting the driving force from the first motor 130 to the second shaft 134b is not limited to the above. Alternatively, the driving force may be transmitted by another member such as a rack and pinion, a cam, or the like.

When the third gear 133c rotates, the seventh to ninth gears 133g to 133i and the third shaft 134c further rotate and the pick roller 111 rotates. More specifically, the first to second pulleys 131a to 131b, the first belt 132a, the first to third and seventh to ninth gears 133a to 133c, 133g to 133i are a driving force transmission mechanism for transmitting the driving force from the first motor 130 to the third shaft 134c. The driving force transmission mechanism for transmitting the driving force from the first motor 130 to the third shaft 134c is not limited to the above. Alternatively, the driving force may be transmitted by another member such as a rack and pinion, a cam, or the like.

When the third shaft 134c rotates, the tenth to eleventh gears 133j to 133k, the third pulley 131c, the second belt 132b, the fourth pulley 131d, the twelfth to thirteenth gears 133l to 133m, and the second shaft 134d rotate. As a result, the shoot roller 110 rotates. More specifically, the first to fourth pulleys 131a to 131d, the first to third belts 132a to 132b, and the first to third and seventh to thirteenth gears 133a to 133c, 133g to 133m are a driving force transmission mechanism for transmitting the driving force from the first motor 130 to the fourth shaft 134d. The driving force transmission mechanism for transmitting the driving force from the first motor 130 to the fourth shaft 134d is not limited to the above. Alternatively, the driving force may be transmitted by another member such as a rack and pinion, a cam, or the like.

It should be noted that the document conveying apparatus 100 includes a second motor, which is different from the first motor 130, to generate a driving force for driving the retard roller 115, the first driving roller 118, and the second driving roller 123. The document conveying apparatus 100 also includes a driving force transmission mechanism including a pulley, a belt, a gear, a shaft, etc., to transmit the driving force generated by the second motor to the retard roller 115, the first driving roller 118, and the second driving roller 123. The driving force transmission mechanism for transmitting the driving force generated by the second motor to the retard roller 115, the first driving roller 118, and the second driving roller 123 is not limited there to. Alternatively, the driving force may be transmitted by another member such as a rack and pinion, a cam, or the like.

Figure 4A:
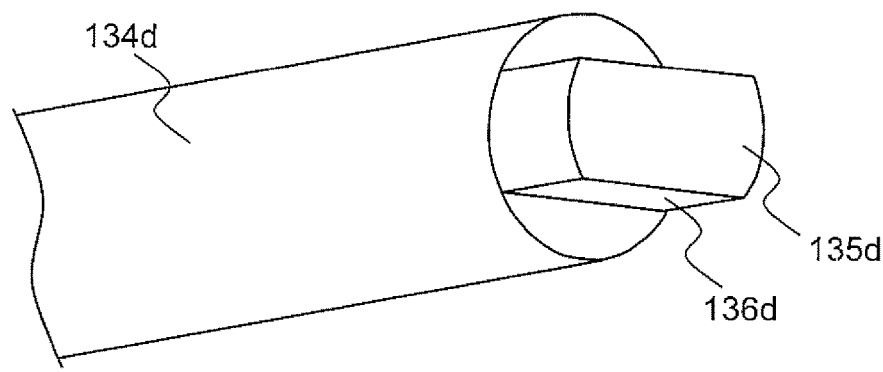
FIG. 4A is a diagram for explaining a structure of a fourth shaft 134d.

FIG. 4A is a diagram for explaining the structure of the fourth shaft 134d which is the driving shaft of the shoot roller 110.

As illustrated in FIG. 4A, a protrusion member 135d rotating in synchronization with the fourth shaft 134d is provided at one end of the fourth shaft 134d at a side where the fourth shaft 134d is in contact with the shoot roller 110. The protrusion member 135d may be integrally formed with the fourth shaft 134d, or may be formed of a member different from the fourth shaft 134d. The protrusion member 135d is an example of a first member.

Figure 4B:
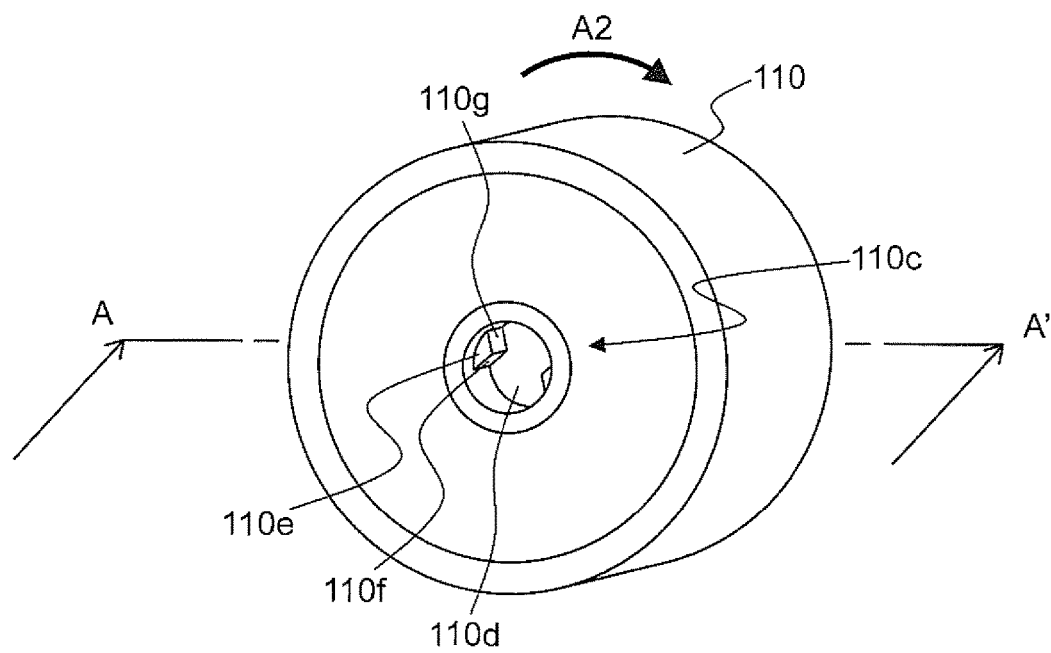
FIG. 4B is a diagram for explaining a structure of a shoot roller 110.

FIG. 4B is a diagram for explaining a structure of the shoot roller 110.

As illustrated in FIG. 4B, a cam member 110c is provided in a portion which is a rotation center portion of the shoot roller 110 and which is between the shoot roller 110 and the fourth shaft 134d. The cam member 110c includes a protrusion member 135d of the fourth shaft 134d, a space (hole portion) 110d into which the protrusion member 135d can be inserted and in which the protrusion member 135d can rotate, a protruding portion 110e provided inside the space 110d, etc., and the cam member 110c is fixed to the shoot roller 110. The protruding portion 110e includes contact portions 110f and 110g which come into contact with a side surface 136d of the protrusion member 135d. The cam member 110c is an example of a first cam member and a first blocking mechanism. The space 110d is an example of a first space. The contact portion 110f is an example of a first contact portion.

Figure 4C:
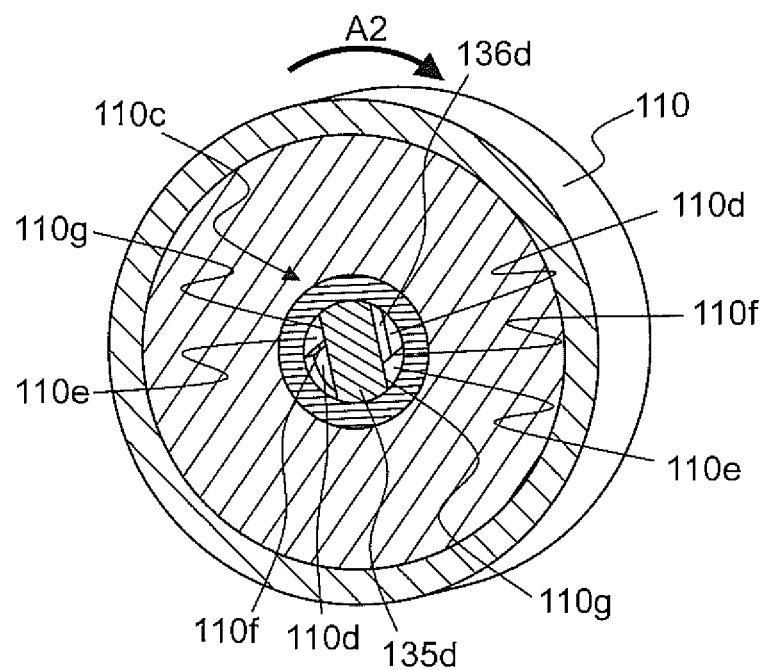
FIG. 4C is a cross sectional view taken along line A-A' of FIG. 4B.

FIG. 4C is a cross sectional view taken along line A-A' of FIG. 4B illustrating the shoot roller 110 while the protrusion member 135d is inserted thereto.

As illustrated in FIG. 4C, the protrusion member 135d is inserted into the cam member 110c. The protrusion member 135d rotates in the space 110d provided in the cam member 110c so as to rotate in the direction of an arrow A2 by the driving force provided by the first motor 130. When the side surface 136d of the protrusion member 135d is not in contact with the contact portion 110f, the shoot roller 110 does not rotate even if the protrusion member 135d rotates in the direction of the arrow A2. On the other hand, when the side surface 136d of the protrusion member 135d is in contact with the contact portion 110f, the shoot roller 110 rotates in the direction of the arrow A2 according to the rotation of the protrusion member 135d in the direction of the arrow A2.

Figure 5A:
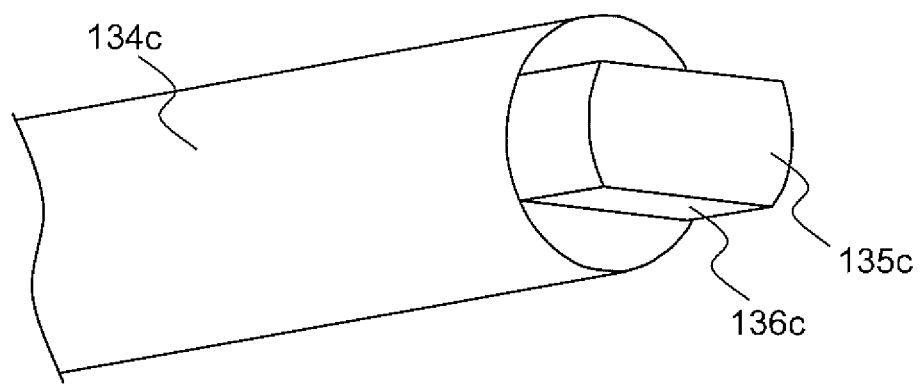
FIG. 5A is a diagram for explaining a structure of a third shaft 134c.

FIG. 5A is a diagram for explaining a structure of the third shaft 134c which is the driving shaft of the pick roller 111a.

As illustrated in FIG. 5A, just like the fourth shaft 134d, a protrusion member 135c rotating synchronously with third shaft 134c is provided at one end of the third shaft 134c at a side where the third shaft 134c is in contact with the pick roller 111a. The protrusion member 135c may be formed integrally with the third shaft 134c, or may be formed of a member different from the third shaft 134c. The protrusion member 135c is an example of a second member.

Figure 5B:
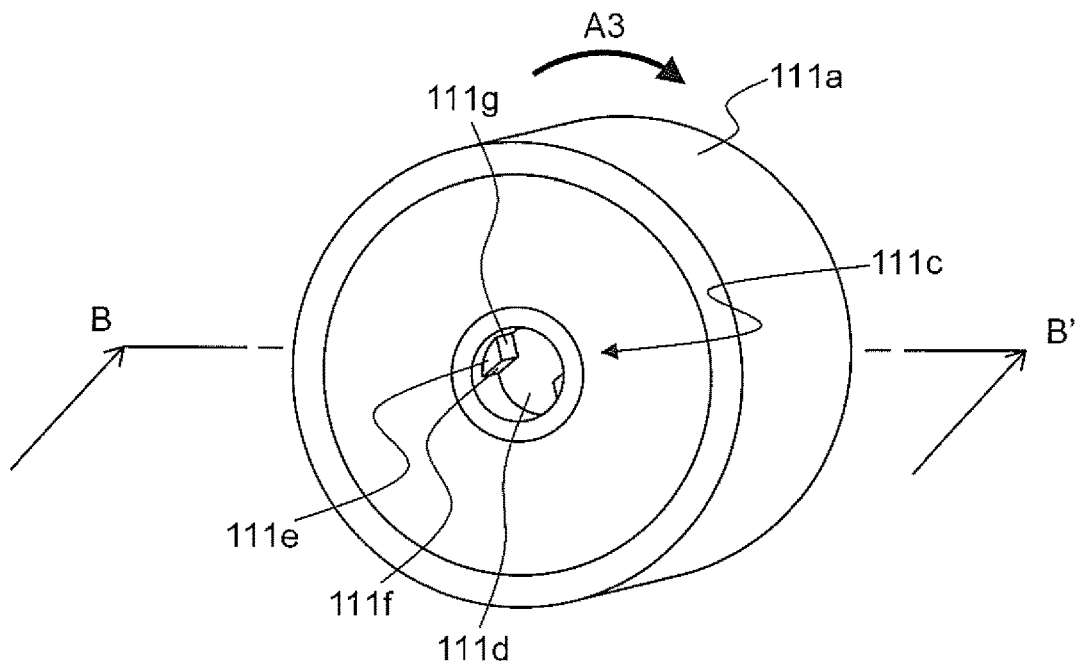

FIG. 5B is a diagram for explaining a structure of the pick roller 111a.

As illustrated in FIG. 5B, a cam member 111c, which is like the cam member 110c of the shoot roller 110, is provided in a portion which is a rotation center portion of the pick roller 111a and which is between the pick roller 111a and the third shaft 134c. The cam member 111c includes the protrusion member 135c of the third shaft 134c, a space (hole portion) 111d into which the protrusion member 135c can be inserted and in which the protrusion member 135c can rotate, a protruding portion 110e provided inside the space 110d, etc., and the cam member 111c is fixed to the pick roller 111a. The protruding portion 111e includes contact portions 111f and 111g that come into contact with the side surface 136c of the protrusion member 135c. The cam member 111c is an example of a second cam member and a second blocking mechanism. The space 111d is an example of a second space. The contact portion 111f is an example of a second contact portion.

Figure 5C:
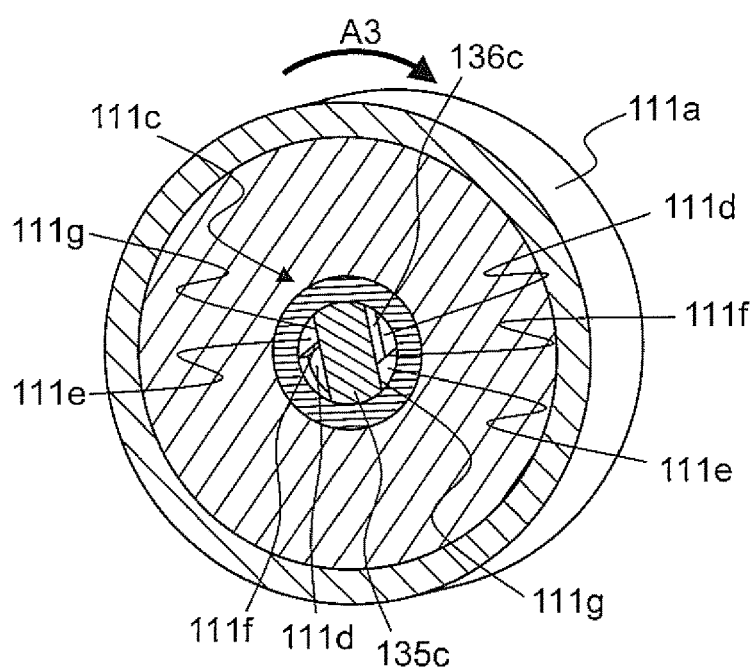
FIG. 5C is a cross sectional view taken along line B-B' of FIG. 5B.

FIG. 5C is a cross sectional view taken along line B-B' of FIG. 5B illustrating the pick roller 111a when the protrusion member 135c is inserted thereto.

As illustrated in FIG. 5C, the protrusion member 135c is inserted into the cam member 111c. The protrusion member 135c rotates in the space 111d provided in the cam member 111c so as to rotate in the direction of an arrow A3 by the driving force provided by the first motor 130. When the side surface 136c of the protrusion member 135c is not in contact with the contact portion 111f, the pick roller 111a does not rotate even if the protrusion member 135c rotates in the direction of the arrow A3. On the other hand, when the side surface 136c of the protrusion member 135c is in contact with the contact portion 111f, the pick roller 111a rotates in the direction of the arrow A3 in accordance with the rotation of the protrusion member 135c in the direction of the arrow A3. It should be noted that the pick roller 111b is provided so as to rotate in synchronization with the rotation of the pick roller 111a.

FIG. 6A, FIG. 6B, FIG. 7A, FIG. 7B, FIG. 8A, FIG. 8B, FIG. 9A, and FIG. 9B are diagrams for explaining document conveying operation performed with the document conveying apparatus 100. In this example, a case where multiple documents D are stacked on the document tray 103 and conveyed will be explained. Multiple documents having such a weight that the multiple documents are not conveyed by only the conveying force of the pick roller 111 are stacked on the document tray 103, and the documents are considered to be conveyed by both the conveying force of the shoot roller 110 and the conveying force of the pick roller 111.

Figure 6A:
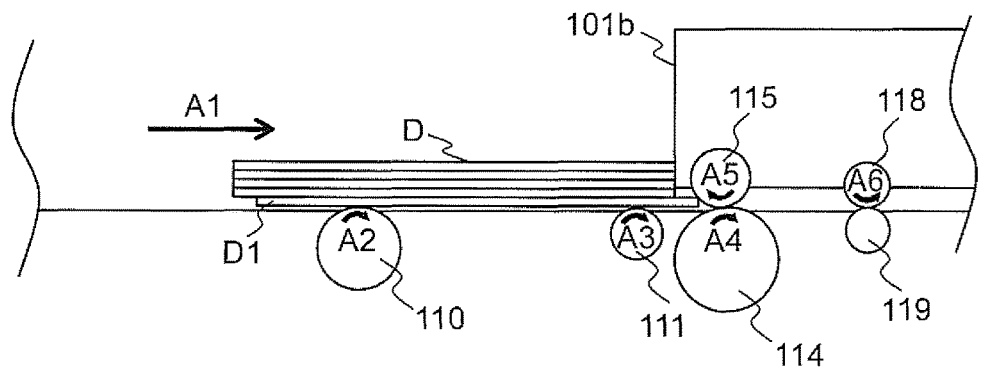
FIG. 6A is a schematic view illustrating a state of a document when a document starts to be conveyed.
Figure 6B:
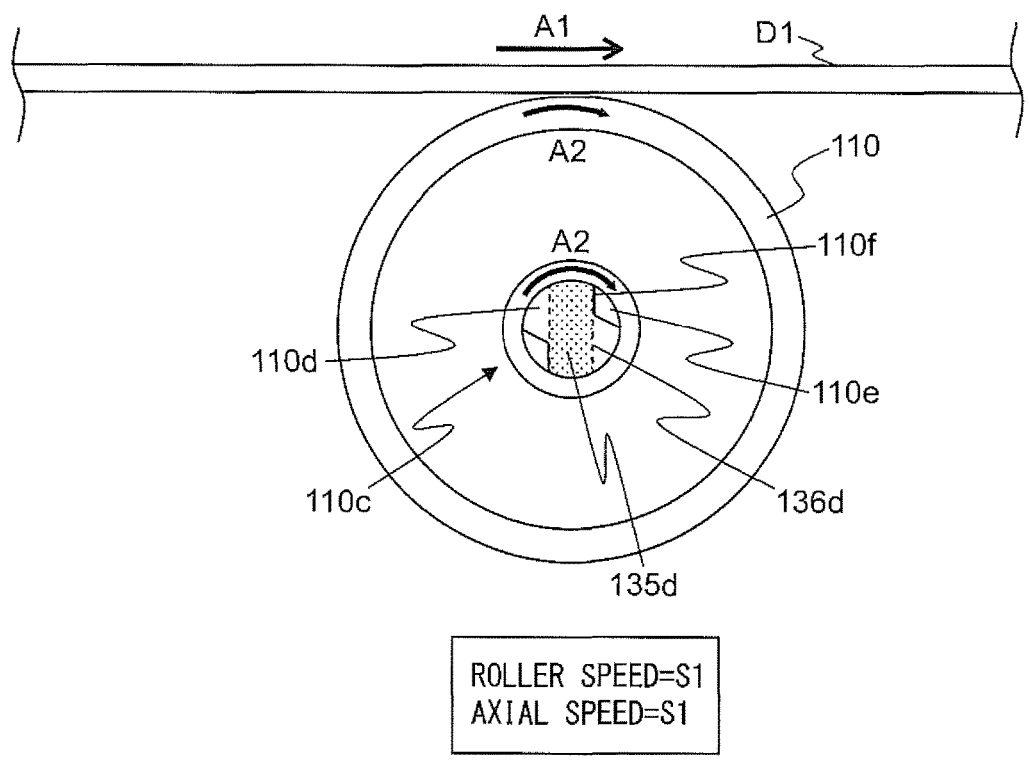
FIG. 6B is a schematic view illustrating a state of the shoot roller 110.

FIG. 6A is a schematic view illustrating a state of a document D when the document starts to be conveyed. FIG. 6B is a schematic view illustrating a state of the shoot roller 110 in the state as illustrated in FIG. 6A.

As illustrated in FIG. 6B, when the protrusion member 135d of the fourth shaft 134d which is the driving shaft of the shoot roller 110 is rotated by the driving force from the first motor 130 and the side surface 136d comes into contact with the contact portion 110f, the shoot roller 110 rotates in the direction of the arrow A2. Although not illustrated in the drawings, when the protrusion member 135c of the third shaft 134c which is the driving shaft of the pick roller 111 is also rotated and the side surface 136c comes into contact with the contact portion 110f, the pick roller 111 rotates in the direction of the arrow A3. As a result, as illustrated in FIG. 6A, a document D1 stacked at the lowermost position, which is one of the documents D stacked on the document tray is conveyed in the document conveying direction A1.

At this occasion, a driving force for conveying the document at the conveying speed S1 is transmitted to the fourth shaft 134d, and the shoot roller 110 rotates so as to convey the document at the conveying speed S1. The driving force is transmitted to the third shaft 134c to rotate the third shaft 134c so as to convey the document at the conveying speed S2 which is faster than the conveying speed S1. However, as described above, the document is not conveyed with the conveying force of the pick roller 111 alone, and the pick roller 111 rotates to convey the document at the conveying speed S1 while being assisted by the shoot roller 110.

Figure 7A:
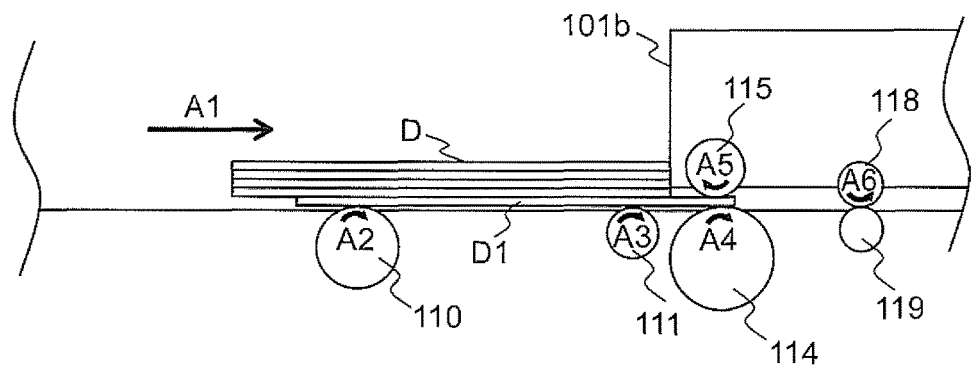
FIG. 7A is a schematic view illustrating a state of a document after a front edge of the document passes a feeding roller.
Figure 7B:
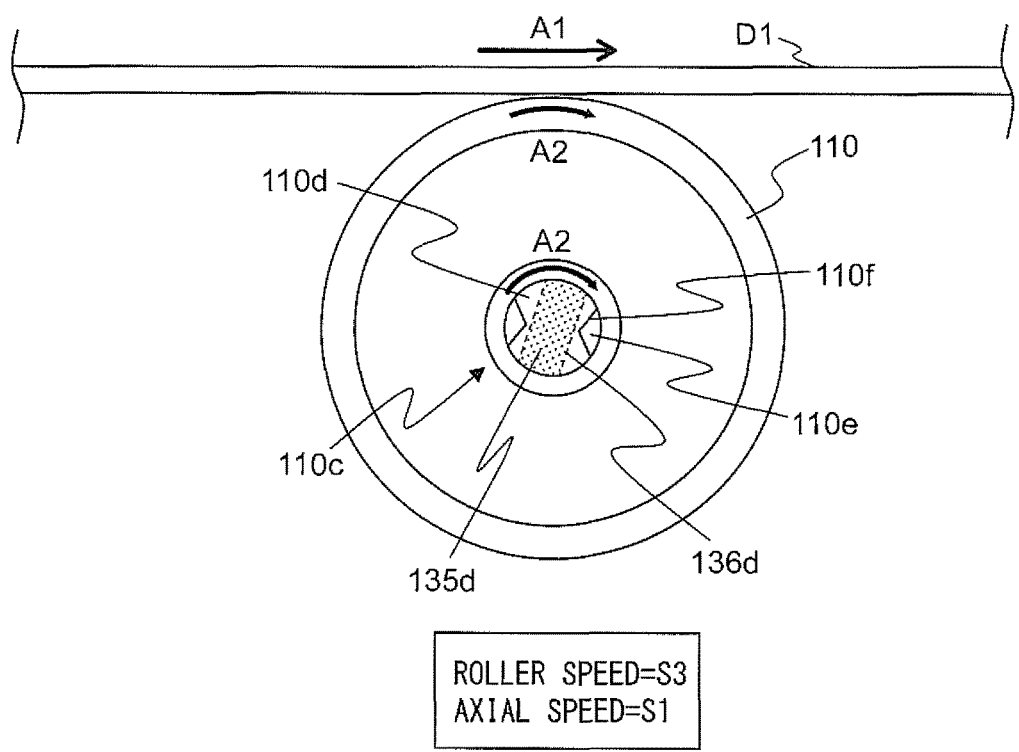
FIG. 7B is a schematic view illustrating a state of the shoot roller 110.

FIG. 7A is a schematic view illustrating a state of a document after a front edge of the document D1 passes the feeding roller 114. FIG. 7B is a schematic view illustrating a state of the shoot roller 110 in the state as illustrated in FIG. 7A.

A driving force is transmitted to the feeding roller 114 to rotate the feeding roller 114 so as to convey the document at the conveying speed S3 which is faster than the conveying speed S1 and the conveying speed S2. Therefore, as illustrated in FIG. 7A, when the front edge of the document D1 passes the feeding roller 114, the document D1 is conveyed in the document conveying direction A1 at the conveying speed S3 by the feeding roller 114.

As illustrated in FIG. 7B, with the frictional force between the document D1 and the shoot roller 110, the shoot roller 110 rotates in the direction of the arrow A2 at such a speed that the document is conveyed at the conveying speed S3. On the other hand, since the driving force is transmitted to the fourth shaft 134d so that the document is conveyed at the conveying speed S1, the side surface 136d of the protrusion member 135d separates from the contact portion 110f. Although not illustrated in the drawings, likewise, with the frictional force between the document D1 and the pick roller 111, the pick roller 111 rotates in the direction of arrow A1 at such a speed that the document is conveyed at the conveying speed S3. On the other hand, since the driving force is transmitted to the third shaft 134c so as to convey the document at the conveying speed S2, the side surface 136c of the protrusion member 135c separates from the contact portion 111f.

Figure 8A:
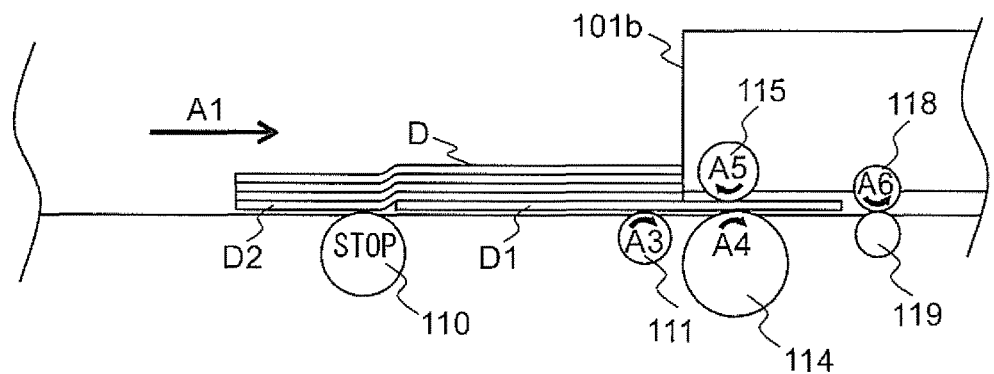
FIG. 8A is a schematic view illustrating a state of a document after a rear edge of the document passes the shoot roller.
Figure 8B:
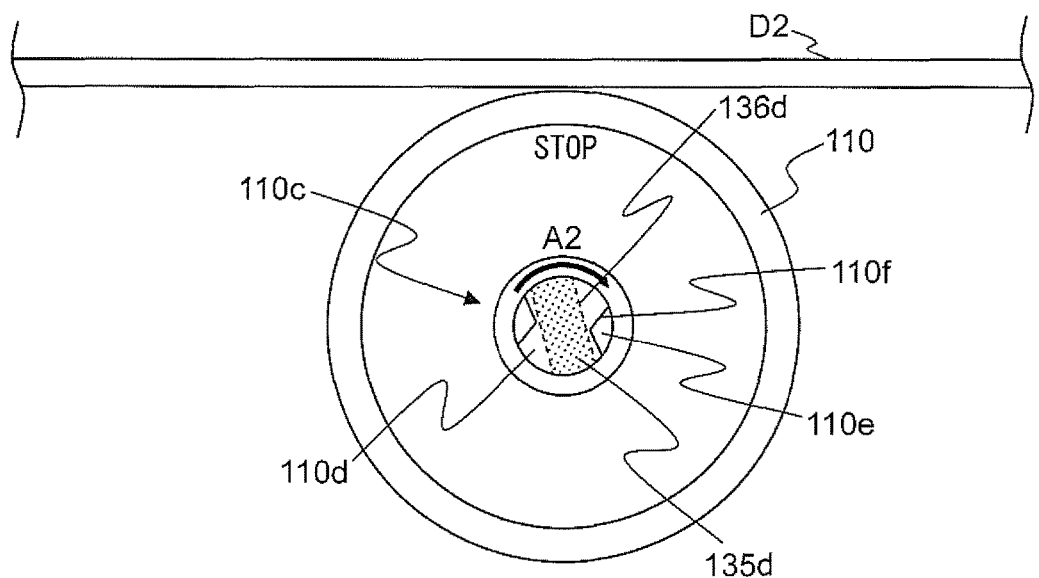
FIG. 8B is a schematic view illustrating a state of the shoot roller 110.

FIG. 8A is a schematic view illustrating a state of a document after a rear edge of the document D1 passes the shooting roller. FIG. 8B is a schematic view illustrating a state of the shoot roller 110 in the state as illustrated in FIG. 8A.

As illustrated in FIG. 8B, when the rear edge of the document D1 passes the shoot roller 110, the document D2 which is stacked on the document D1 and which is not conveyed by the feeding roller 114 comes into contact with the shoot roller 110. With the driving force given by the first motor 130, the protrusion member 135d continues to rotate but the side surface 136d is away from the contact portion 110f. Therefore, while the protrusion member 135d rotates in the space 110d until the side surface 136d comes into contact with the contact portion 110f, the driving force transmitted to the fourth shaft 134d which is the driving shaft of the shoot roller 110 is blocked so that the driving force is not transmitted to the shoot roller 110.

Therefore, as illustrated in FIG. 8A, the shoot roller 110 stops without rotating, so that the document D2 is not conveyed.

Figure 9A:
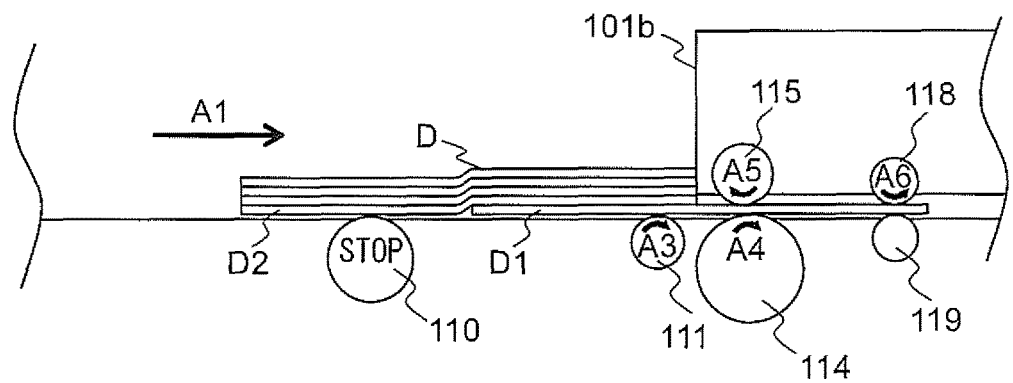
FIG. 9A is a schematic view illustrating a state of a document after a front edge of the document passes a first driving roller.

FIG. 9A is a schematic view illustrating a state of a document after the front edge of the document D1 passes the first driving roller 118. FIG. 93 is a schematic view illustrating a state of the shoot roller 110 in the state as illustrated in FIG. 9A.

Figure 9B:
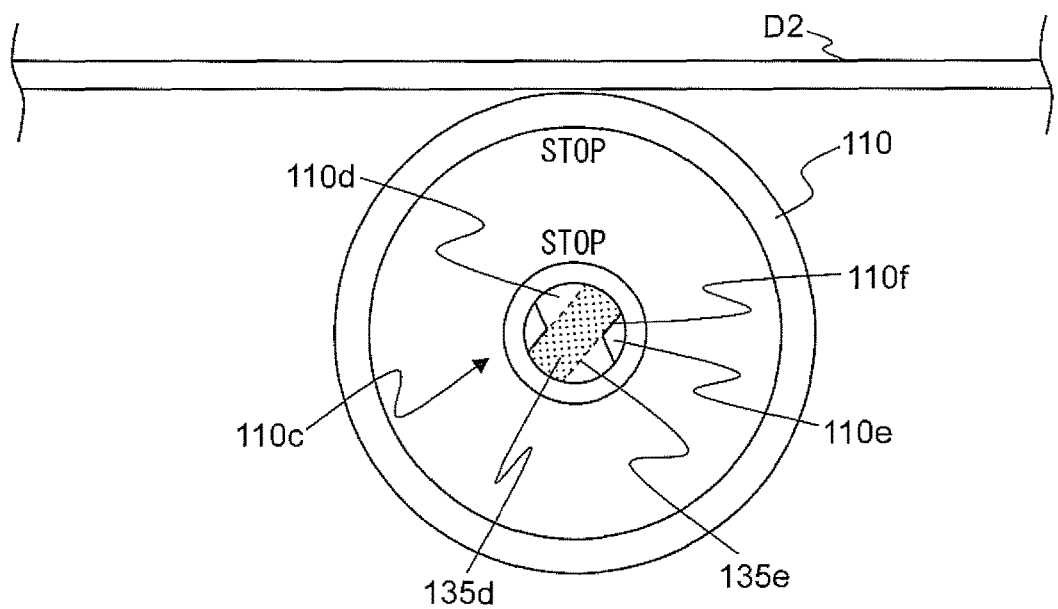
FIG. 9B is a schematic view illustrating a state of the shoot roller 110.

When the front edge of the document D1 passes the first driving roller 118, the first document D1 is thereafter conveyed by the first driving roller 118 and the second driving roller 123 with the driving force provided by the second motor, so that the first motor 130 is stopped. As a result, as illustrated in FIG. 9B, the protrusion member 135d stops, and as illustrated in FIG. 9A, the shoot roller 110 stops without rotating, so that the document D2 is not conveyed.

Thereafter, when the rear edge of the document D1 passes the feeding roller 114 and the first light sensor 116 provided on the downstream side with respect to the feeding roller 114 detects the rear edge of the document D1, the first motor 130 is driven again, so that a subsequent document D2 starts to be conveyed. When the side surface 136d comes into contact with the contact portion 110f before the rear edge of the document D1 passes the feeding roller 114, the shoot roller 110 restarts the rotation, so that the document D2 is conveyed.

As described above, for a first certain period of time since the rear edge of the document conveyed by the shoot roller 110 passes the shoot roller 110, the cam member 110c blocks the driving force transmitted to the driving shaft of the shoot roller 110 so that the driving force is not transmitted to the shoot roller 110. The details of the first certain period of time will be described later. Therefore, a subsequent (waiting) document is not conveyed before the document being conveyed passes a separation module (the feeding roller 114 and the retard roller 115) for the document, so that a jam of the document does not occur in the separation module.

The pick roller 111 also operates in the same manner as the shoot roller 110. More specifically, when the rear edge of the document D1 passes the pick roller 111, the document D2 stacked on the document D1 comes into contact with the pick roller 111. With the driving force provided by the first motor 130, the protrusion member 135c of the third shaft 134c, which is the driving shaft of the pick roller 111, continues to rotate, but the side surface 136c is away from the contact portion 111f. Therefore, while the protrusion member 135c rotates in the space 111d until the side surface 136c comes into contact with the contact portion 111f, the driving force transmitted to the third shaft 134c is blocked so that the driving force is not transmitted to the pick roller 111. Therefore, the pick roller 111 stops without rotating and the document D2 is not conveyed. When the front edge of the document D1 passes the first driving roller 118, the first motor 130 is stopped, and the protrusion member 135c is stopped, so that the pick roller 111 is stopped without rotating, and the document D2 is not conveyed.

Thereafter, when the rear edge of the document D1 passes the feeding roller 114 and the first light sensor 116 provided on the downstream side with respect to the feeding roller 114 detects the rear edge of the document D1, the first motor 130 is driven again and the subsequent document D2 starts to be conveyed. When the side surface 136c comes into contact with the contact portion 111f before the rear edge of the document D1 passes the feeding roller 114, the pick roller 111 restarts the rotation, and the document D2 is conveyed.

As described above, for a second certain period of time since a rear edge of a document conveyed by the pick roller 111 passes the pick roller 111, the cam member 111c blocks the driving force transmitted to the driving shaft of the pick roller 111 so that the driving force is not transmitted to the pick roller 111. The details of the second certain period of time will be described later. Therefore, a subsequent (waiting) document is not conveyed before the document being conveyed passes the separation module, so that a jam of the document does not occur in the separation module.

Figure 10:
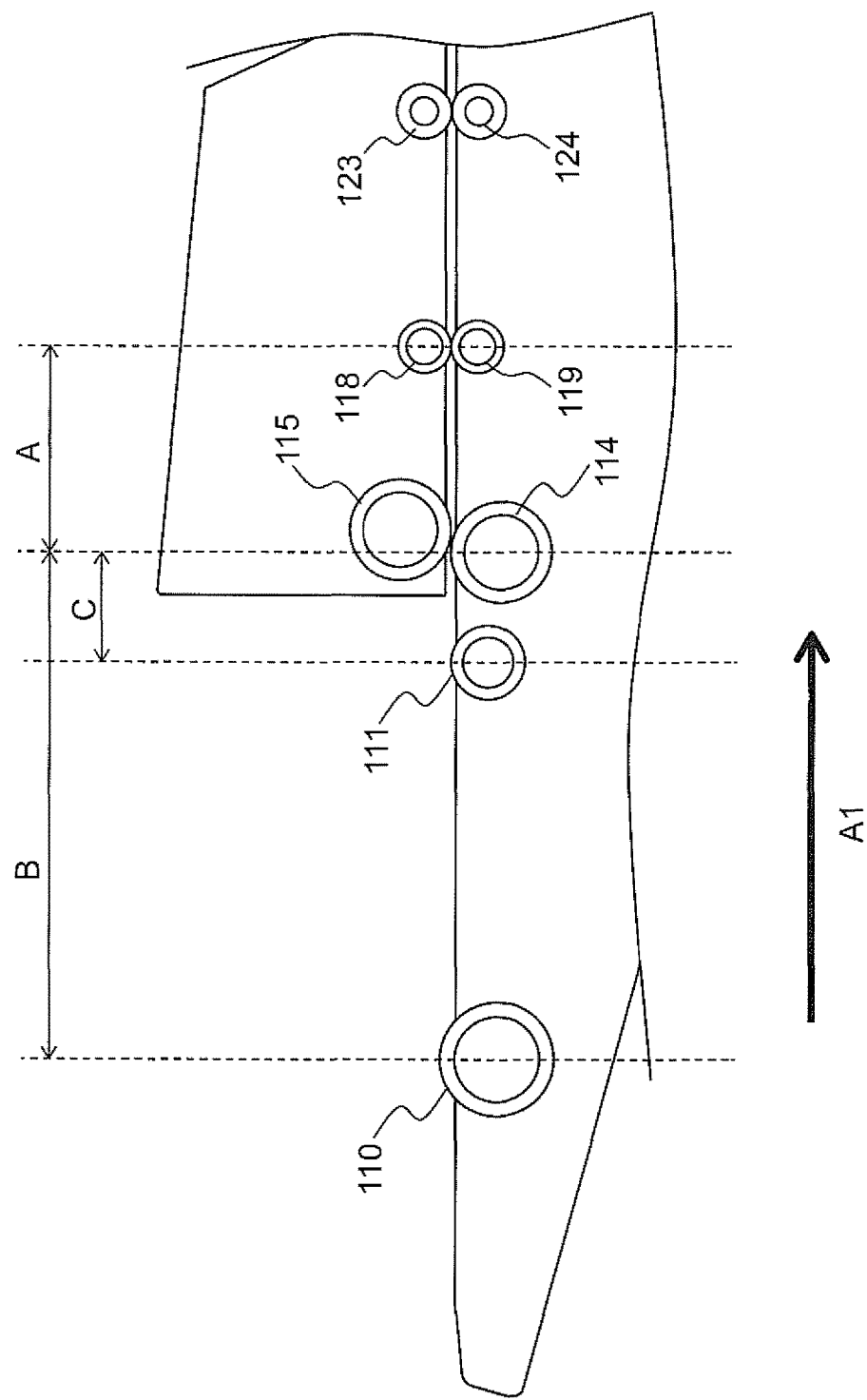
FIG. 10 is a schematic view for explaining a first certain period of time and a second certain period of time.

FIG. 10 is a schematic view for explaining the first certain period of time in which the rotation of the shoot roller 110 is at a stop and the second certain period of time in which the rotation of the pick roller 111 is at a stop.

As described above, the shoot roller 110 is preferably stopped from when the rear edge of the document to be conveyed passes the shoot roller 110 to when the front edge of the document passes the first driving roller 118.

When the document is longer than a distance (A+B) between the shoot roller 110 and the first driving roller 118, the front edge of the document has already passed the first driving roller 118 when the rear edge of the document passes the shoot roller 110. Therefore, the shoot roller 110 does not need to be stopped. However, even if a document longer than the distance (A+B) is conveyed, which does not require the shoot roller 110 to be stopped, the document conveying apparatus 100 stops the shoot roller 110 only for the first certain period of time. The longer the first certain period of time is, the larger the conveying processing time for the document, which is longer than the distance (A+B), will be. Therefore, the first certain period of time is preferably as short as possible as long as a jam of the document does not occur.

On the other hand, when the document is shorter than the distance (B) between the shoot roller 110 and the feeding roller 114, the document is not stacked on the shoot roller 110. Therefore, the shoot roller 110 does not need to be stopped. In view of the above, the first certain period of time is set to be equal to or less than a period of time from when the rear edge of the document having a length of the distance (B) between the shoot roller 110 and the feeding roller 114 passes the shoot roller 110 to when the front edge of the document passes the first driving roller 118. Since the front edge of the document has already passed feeding roller 114 when the rear edge of the document having a length of the distance (B) passes the shoot roller 110, the first certain period of time is set to be equal to or less than a time for conveying the document for the distance (A) between the feeding roller 114 and the first driving roller 118.

Likewise, the second certain period of time is also set to be equal to or less than a period of time for conveying the document for the distance (A) between the feeding roller 114 and the first driving roller 118.

The first certain period of time and the second certain period of time may be determined based on standard sizes of paper defined in accordance with a specific standard, which are some of the sizes of the documents supported by the document conveying apparatus 100. Examples of specific standards include: A series and B series defined in ISO (International Organization for Standardization) 216; letter size and tabloid/ledger size defined by the American National Standards Institute (ANSI)/American Society of Mechanical Engineers (ASME) Y 14.1; or legal size which is a size for public documents of the United States Government.

FIG. 11 is a table illustrating a list of standard sizes of paper.

For example, a case where the distance (A) between the feeding roller 114 and the first driving roller 118 is 60 mm and the distance (B) between the shoot roller 110 and the feeding roller 114 is 155 mm will be explained. When a document larger than the width of letter size (216 mm) which is one of the standard sizes illustrated in FIG. 11 is to be conveyed, the size of the document is longer than the distance (A+B) (215 mm) between the shoot roller 110 and the first driving roller 118. Therefore, the shoot roller 110 does not need to be stopped. When a document smaller than the height of A6 size and the width of A5 size (148 mm) which are among the standard sizes illustrated in FIG. 11 is to be conveyed, the size of the document is shorter than the distance (B) (155 mm) between the shoot roller 110 and the feeding roller 114. Therefore, the shoot roller 110 does not need to be stopped.

Therefore, when a document having the height of A5 size and the width of A4 size (210 mm) and the height of A6 size and the width of A5 size (182 mm) which are among the standard sizes illustrated in FIG. 11 is to be conveyed, the shoot roller 110 may be stopped as necessary. When the first certain period of time is set so that the shoot roller 110 is stopped as necessary when a document having the height of A6 size and the width of A5 size (182 mm), the shoot roller 110 is also stopped as necessary when a document having the height of A5 size and the width of A4 size (210 mm) is conveyed.

Therefore, the first certain period of time is set to a period of time from when the rear edge of the document having the height of A6 size and the width of A5 size passes the shoot roller 110 to when the front edge of the document passes the first driving roller 118. More specifically, the first certain period of time is set to a period of time for conveying the document for a distance (33 mm) obtained by subtracting the height of A6 size and the width of A5 size (182 mm) from the distance (A+B) (215 mm) between the shoot roller 110 and the first driving roller 118.

As described above, the first certain period of time is set to equal to or less than a period of time for conveying the document for the distance obtained by subtracting a standard size of paper defined by the specific standard from the distance (A+B) between the shoot roller 110 and the first driving roller 118. The standard size is a size which is equal to or less than the distance (A+B) between the shoot roller 110 and the first driving roller 118 and equal to or more than the distance (B) between the shoot roller 110 and the feeding roller 114. Preferably, the standard size is the smallest size of the sizes equal to or less than the distance (A+B) between the shoot roller 110 and the first driving roller 118 and equal to or more than the distance (B) between the shoot roller 110 and the feeding roller 114.

The second certain period of time can also be defined in the same manner as the first certain period of time. For example, a case where the distance (A) between the feeding roller 114 and the first driving roller 118 is 60 mm and the distance (C) between the pick roller 111 and the feeding roller 114 is 20 mm will be explained. When a document equal to or more than the height of B8 size and the width of B7 size (91 mm) which are among the standard sizes illustrated in FIG. 11 is to be conveyed, the size of the document is longer than the distance (A+C) (80 mm) between the pick roller 111 and the first driving roller 118. Therefore, the pick roller 111 does not need to be stopped.

Therefore, when a document smaller than the height of A8 size and the width of A7 size (74 mm) which is among the standard sizes illustrated in FIG. 11 is to be conveyed, the pick roller 111 may be stopped as necessary.

Therefore, the second certain period of time is set to a period of time from when the rear edge of the document having the height of A8 size and the width of A7 size passes the pick roller 111 to when the front edge of the document passes the first driving roller 118. More specifically, the second certain period of time is set to a period of time for conveying the document for a distance (6 mm) obtained by subtracting the height of A8 size and the width of A7 size (74 mm) from the distance (A+C) (80 mm) between the pick roller 111 and the first driving roller 118.

As described above, the second certain period of time is set to a period of time for conveying the document for the distance obtained by subtracting a standard size of paper defined by the specific standard from the distance (A+C) between the pick roller 111 and the first driving roller 118. The standard size is a size which is equal to or less than the distance (A+C) between the pick roller 111 and the first driving roller 118 and equal to or more than the distance (C) between the pick roller 111 and the feeding roller 114. Preferably, the standard size is the smallest size of the sizes equal to or less than the distance (A+C) between the pick roller 111 and the first driving roller 118 and equal to or more than the distance (C) between the pick roller 111 and the feeding roller 114.

An experiment was conducted to repeatedly convey documents having the height of A6 size while changing the first certain period of time. As a result, it was found that a jam of the document frequently occurs when the first certain period of time is set to less than 10% of the period of time for conveying the document for the distance (B) between the shoot roller 110 and the feeding roller 114. Therefore, the first certain period of time is preferably set to equal to or more than 10% of the period of time for conveying the document for the distance (B) between the shoot roller 110 and the feeding roller 114.

It should be noted that the maximum value of the first certain period of time is determined by the outer diameter of the shoot roller 110, the angle formed by the contact portion 110*f* and contact portion 110*g* of the cam member 110*c*, etc. The first certain period of time is determined in accordance with the conveying speed S1 of the document conveyed by the shoot roller 110, i.e., the rotation speed of the first motor 130, and the sizes of the pulley or the gear which is the mechanism for transmitting the driving force from the first motor 130 to the shoot roller 110, the outer diameter of the shoot roller 110, etc. Likewise, the maximum value of the second certain period of time is determined by the outer diameter of the pick roller 111, the angle formed by the contact portion 111*f* and the contact portion 111*g* of the cam member 111*c*, etc. The second certain period of time is determined in accordance with the conveying speed S2 of the document conveyed by the pick roller 111, i.e., the rotation speed of the first motor 130, and the sizes of the pulley or the gear which is the mechanism for transmitting the driving force from the first motor 130 to the pick roller 111, the outer diameter of the pick roller 111, etc.

The first certain period of time in which the rotation of the shoot roller 110 is at a stop is set to be longer than the second certain period of time in which the rotation of the pick roller 111 is at a stop. Therefore, the document conveying apparatus 100 is configured so that, while the pick roller 111 is conveying a document, the shoot roller 110 does not start to convey a document, which is to be subsequently conveyed. As a result, the document conveying apparatus 100 can prevent an occurrence of a jam.

The conveying speed S1 of the document conveyed by the shoot roller 110 is set to be slower than the conveying speed S2 of the document conveyed by the pick roller 111. Therefore, this prevents that the document is deformed (warped at the position between the shoot roller 110 and the pick roller 111) due to the force for pushing the back side of the document being larger than the force for pulling the front side of the document, and this prevents an occurrence of a jam of the document. The first certain period of time is determined in accordance with the difference between the conveying speed S1 and the conveying speed S3 of the document conveyed by the feeding roller 114, and the second certain period of time is determined in accordance with the difference between the conveying speed S1 and the conveying speed S2, and therefore, the first certain period of time can be easily set to be more than the second certain period of time.

Figure 12:
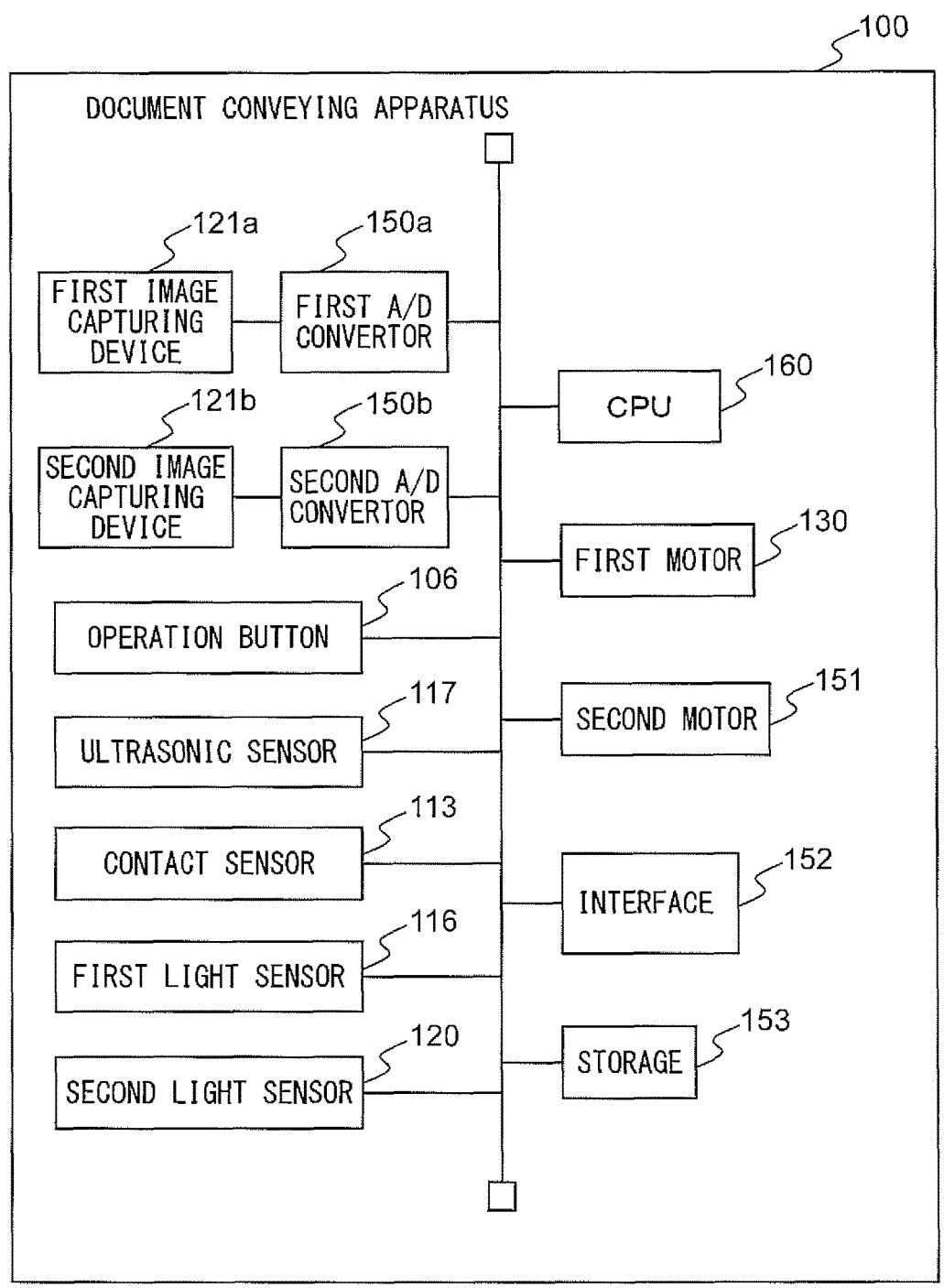
FIG. 12 is a block diagram illustrating a schematic configuration of the document conveying apparatus 100.

FIG. 12 is a block diagram illustrating a schematic configuration of the document conveying apparatus 100.

The document conveying apparatus 100 includes not only the configuration described above but also a first A/D convertor 150*a*, a second A/D convertor 150*b*, a second motor 151, an interface 152, a storage 153, a CPU (Central Processing Unit) 160, etc.

The first A/D converter 150*a* performs analog digital conversion to convert an analog image signal which is output from the first image capturing device 121*a*, and generate digital image data, and outputs the digital image data to the CPU 160. Likewise, the second A/D converter 150*b* performs analog digital conversion to convert an analog image signal which is output from the second image capturing device 121*b*, and generate digital image data, and outputs the digital image data to the CPU 160. These digital image data are used as read image. Hereinafter, the first A/D converter 150*a* and the second A/D converter 150*b* may be collectively referred to as the A/D converter 150.

The second motor 151 is a motor different from the first motor 130 and includes one or more motors. The second motor 151 generates a driving force for driving (rotating) the retard roller 115, the first driving roller 118, and the second driving roller 123 in accordance with the control signal provided by the CPU 160, and performs the conveying operation of the document.

The interface 152 includes, for example, an interface circuit based on a serial bus such as USB, and electrically connects with an information processing apparatus, not shown (for example, a personal computer, a portable information terminal, etc.), and transmits and receives read images and various kinds of information. Instead of the interface 152, an antenna for transmitting and receiving a wireless signal and a communication module having a wireless communication interface circuit for transmitting and receiving a signal via a wireless communication circuit in accordance with a predetermined communication protocol may be used. The predetermined communication protocol may be, for example, a wireless LAN (Local Area Network).

The storage 153 includes memory devices such as a RAM (Random Access Memory), a ROM (Read Only Memory), etc., a fixed disk device such as a hard disk, or a portable storage device such as a flexible disk, an optical disk, etc. The storage 153 stores computer programs, databases, tables, etc., used for various kinds of processing of the document conveying apparatus 100. The computer program may be installed on the storage 153 from a computer-readable, non-transitory medium such as a compact disk read only memory (CD-ROM), a digital versatile disk read only memory (DVD-ROM), etc., by using a well-known setup program, etc. Further, the storage 150 stores the read images.

The CPU 160 operates based on a program stored in the storage 153 in advance. Alternatively, a DSP (digital signal processor), an LSI (large scale integration), etc., may be used instead of the CPU 150. As another alternative, an ASIC (Application Specific Integrated Circuit), an FPGA (Field-Programming Gate Array), etc., may be used instead of the CPU 150.

The CPU 160 is connected to the operation button 106, the contact sensor 111, the first light sensor 116, the ultrasonic sensor 117, the second light sensor 120, the image capturing device 121, the A/D converter 150, the first motor 130, the second motor 151, the interface 152, the storage 153, etc., and controls each of these modules. The CPU 160 performs driving control of the first motor 130 and the second motor 151, and document reading control of the image capturing device 121, etc., and obtains read images.

Figure 13:
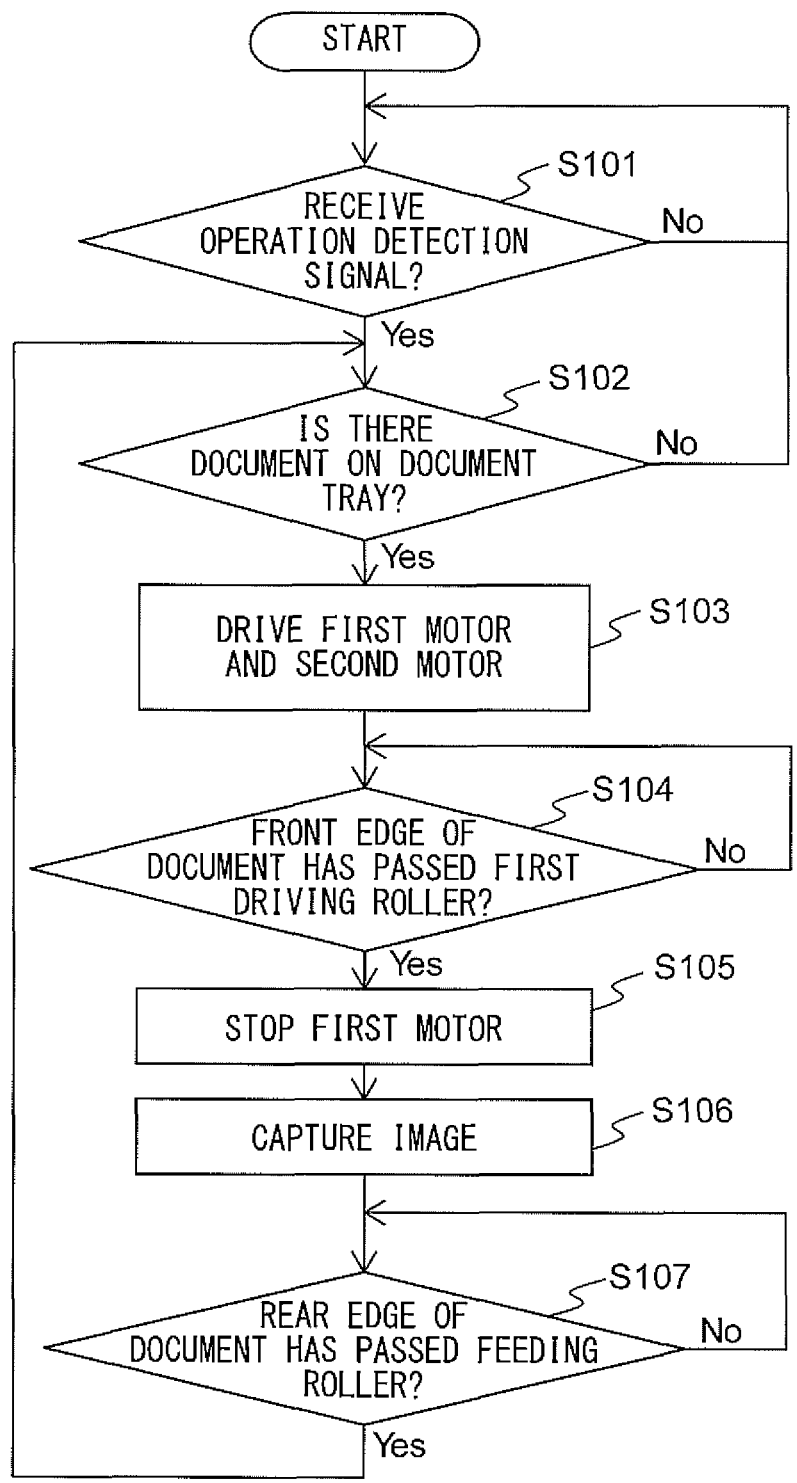
FIG. 13 is a flowchart illustrating an example of an operation of document reading processing.

FIG. 13 is a flow chart illustrating an example of an operation of document reading processing of the document conveying apparatus 100.

Hereinafter, an example of an operation of the entire processing of the document conveying apparatus 100 will be explained with reference to the flow chart as depicted in FIG. 13. It should be noted that the flow of the operation explained below is executed mainly by the CPU 160 in cooperation with each element of the document conveying apparatus 100 based on a program stored in the storage 153 in advance.

At first, the CPU 160 waits until the control module 161 receives, from the operation button 106, an operation detection signal for commanding reading a document when a user presses down the operation button 106 for commanding reading of the document (step S101).

Subsequently, based on the first document detection signal received from the contact sensor 113, the CPU 160 determines whether or not the document is stacked on the document tray 103 (step S102).

When any document is not stacked on the document tray 103, the CPU 160 returns the processing back to step S101 and waits until a new operation detection signal is received from the operation button 106.

On the other hand, when a document is stacked on the document tray 103, the CPU 160 drives the first motor 130 to rotate the shoot roller 110, the pick roller 111, and the feeding roller 114 to convey the document. Further, the CPU 160 drives the second motor 151 to rotate the retard roller 115, the first driving roller 118, and the second driving roller 123 (step S103).

Subsequently, based on the third document detection signal received from the second light sensor 120, the CPU 160 determines whether or not the front edge of the document is present at the position of the second light sensor 120, and more specifically, the CPU 160 determines whether or not the front edge of the document has passed the position of the first driving roller 118 (step S104). The CPU 160 may determine whether or not the front edge of the document has passed the position of the first driving roller 118 based on the time (the number of clocks) for which the first motor 130 and second motor 151 are driven.

The CPU 160 waits until it is determined that the front edge of the document has passed the position of the first driving roller 118. When the front edge of the document is determined to have passed the position of the first driving roller 118, the CPU 160 stops the first motor 130 (step S105).

Subsequently, the CPU 160 causes the image capturing device 121 to capture an image of the conveyed document (step S106). Thereafter, the CPU 160 obtains, via an A/D conversion device 150, a read image of the document captured by the image capturing device 121, and transmits the image via an interface device 152 to a processing apparatus, not illustrated.

Subsequently, based on the second document detection signal received from the first light sensor 116, the CPU 160 determines whether or not the rear edge of the document is present at the position of the first light sensor 116, and more specifically, the CPU 160 determines whether or not the rear edge of the document has passed the positions of the feeding roller 114 and the retard roller 115 (step S107).

The CPU 160 waits until it is determined that the rear edge of the document has passed the positions of the feeding roller 114 and retard roller 115. When the rear edge of the document passes the position of the feeding roller 114 and the retard roller 115, the CPU 160 returns processing back to step S102 and repeats the processing of steps S102 to S107. When the processing of step S103 is executed after returning back from step S107, the second motor 151 has already been driven, and accordingly, the CPU 160 omits the driving processing of the second motor 151. When returning from step S107 and it is determined in step S102 that the document is not stacked on the document tray 103, the CPU 160 stops the second motor 151.

As described above in detail, the document conveying apparatus 100 uses only the first motor 130 to drive the shoot roller 110 and the pick roller 111 for conveying the document stacked on the document tray 103 and the feeding roller 114 for separating the document. In the document conveying apparatus 100, a delay structure is provided with the shoot roller 110 provided at the most upstream position, so that the shoot roller 110 does not operate for a certain period of time since the rear edge of the document has passed. Therefore, in the document conveying apparatus 100, a subsequent document is not conveyed before the document being conveyed passes the separation module, so that the document conveying apparatus 100 can prevent an occurrence of a jam of documents in the separation module. Therefore, in the document conveying apparatus 100 in which the shoot roller 110, the pick roller 111, and the feeding roller 114 are driven by only the first motor 130, the rotation of each roller can be properly controlled.

The document conveying apparatus 100 can drive the shoot roller 110, the pick roller 111, and the feeding roller 114 by using only the first motor 130. Therefore, the cost can be reduced, and the electric power consumption can be reduced.

Figure 14:
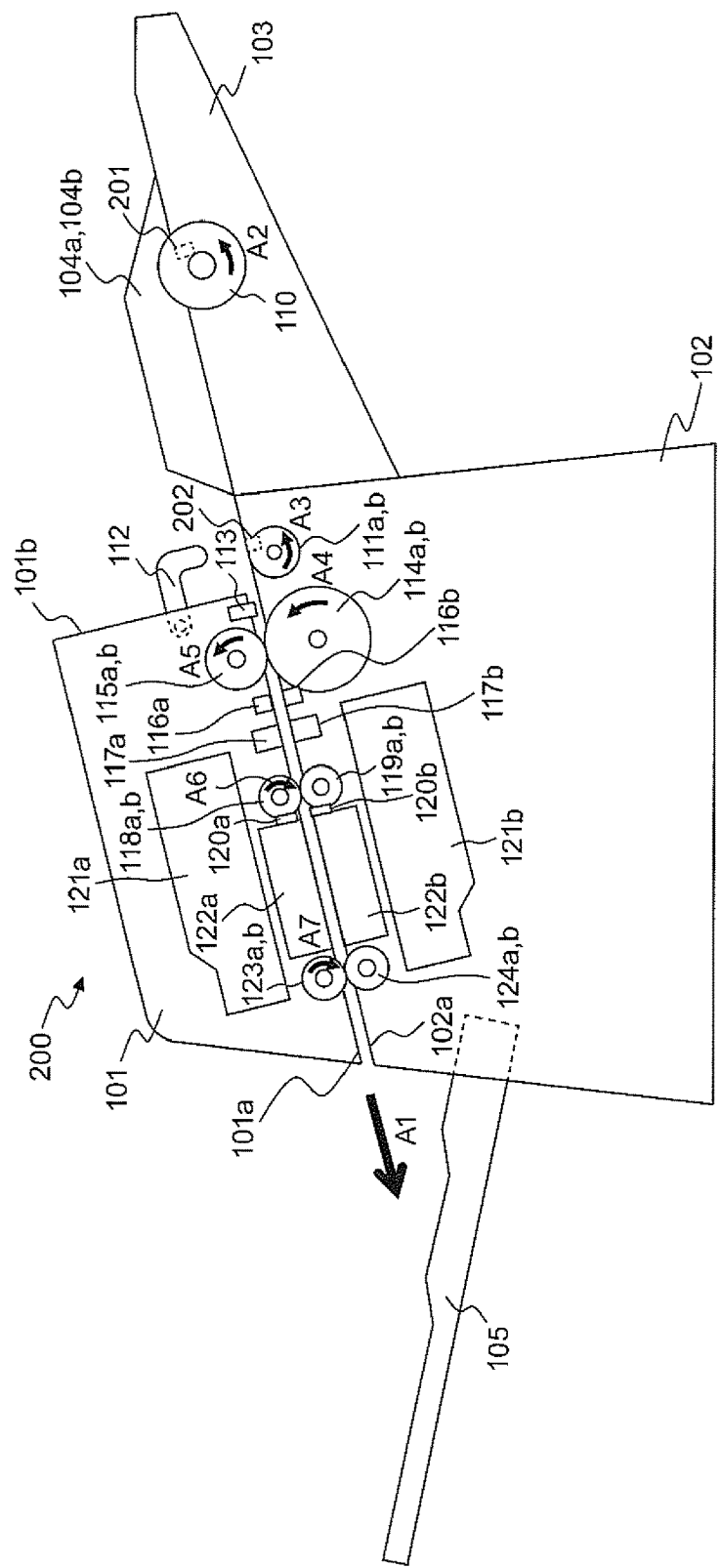
FIG. 14 is a diagram for explaining a conveying path in a document conveying apparatus 200.

FIG. 14 is a diagram for explaining a conveying path in a document conveying apparatus 200 according to another embodiment.

As illustrated in FIG. 14, the document conveying apparatus 200 includes respective modules provided in the document conveying apparatus 100 and also a first encoder 201, a second encoder 202, etc.

The first encoder 201 is disposed on the upstream side with respect to the shoot roller 110, and measures the conveying amount of the document stacked on the document tray 103. The first encoder 201 generates and outputs a first conveying amount signal according to the conveying amount of the document stacked on the document tray 103.

The second encoder 202 is disposed on the upstream side with respect to the pick roller 111, and measures the conveying amount of the document stacked on the document tray 103. The second encoder 202 generates and outputs a second conveying amount signal according to the conveying amount of the document stacked on the document tray 103.

Figure 15:
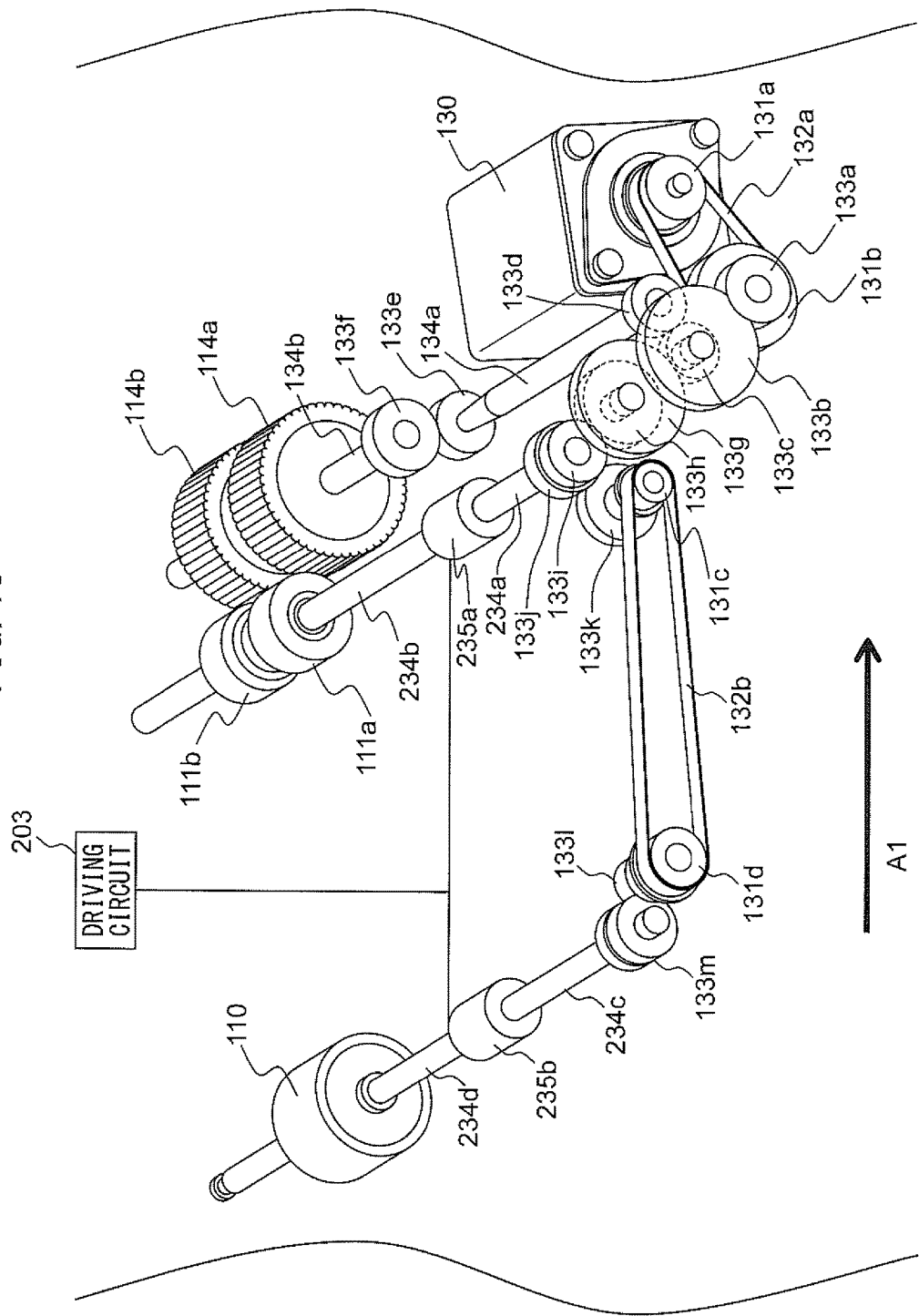
FIG. 15 is a diagram for explaining a driving force transmission mechanism.

FIG. 15 is a diagram for explaining a driving force transmission mechanism for the shoot roller 110, the pick roller 111, and the feeding roller 114 in the document conveying apparatus 200.

As illustrated in FIG. 15, the document conveying apparatus 200 includes fifth to eighth shafts 234a to 234d, first to second electromagnetic clutches 235a to 235b, etc., instead of the third to fourth shafts 134c to 134d provided in the document conveying apparatus 100.

The ninth gear 133i is attached to one end of a fifth shaft 234a which is the driving shaft of the pick roller 111. The other end of the fifth shaft 234a is attached to one end of a sixth shaft 234b with a first electromagnetic clutch 235a interposed therebetween. The sixth shaft 234b is attached to the pick roller 111 so as to rotate in synchronization with the pick roller 111.

The thirteenth gear 133m is attached to one end of a seventh shaft 234c which is the driving shaft of the shoot roller 110. The other end of the seventh shaft 234c is attached to one end of an eighth shaft 234d with a second electromagnetic clutch 235b interposed therebetween. The eighth shaft 234d is attached to the shoot roller 110 so as to rotate in synchronization with the shoot roller 110.

The first electromagnetic clutch 235a is another example of the second blocking mechanism. In accordance with the control signal provided by the control circuit 203, the first electromagnetic clutch 235a connects the sixth shaft 234b to the fifth shaft 234a so that the sixth shaft 234b rotates in synchronization with the fifth shaft 234a. In accordance with the control signal provided by the control circuit 203, the first electromagnetic clutch 235a cuts off transmission between the sixth shaft 234b and the fifth shaft 234a so that the sixth shaft 234b does not rotate regardless of the rotation of the fifth shaft 234a.

The second electromagnetic clutch 235b is another example of the first blocking mechanism. In accordance with the control signal provided by the control circuit 203, the second electromagnetic clutch 235b connects the eighth shaft 234d to the seventh shaft 234c so that the eighth shaft 234d rotates in synchronization with the seventh shaft 234c. In accordance with the control signal provided by the control circuit 203, the second electromagnetic clutch 235b cuts off transmission between the eighth shaft 234d and the seventh shaft 234c so that the eighth shaft 234d does not rotate regardless of the rotation of the seventh shaft 234c.

In accordance with the control from the CPU 160, the control circuit 203 outputs control signals to the first electromagnetic clutch 235a and the second electromagnetic clutch 235b.

The CPU 160 of the document conveying apparatus 200 executes document reading processing according to the flowchart illustrated in FIG. 13. However, when the document is conveyed in step S103, the CPU 160 controls the second electromagnetic clutch 235b so as to connect the eighth shaft 234d and the seventh shaft 234c. The CPU 160 receives the first conveying amount signal from the first encoder 201 and monitors the state of the first encoder 201. When the CPU 160 detects that the conveying amount of the document is equal to or less than a threshold value based on the first conveying amount signal, the CPU 160 determines that the rear edge of the document has passed the shoot roller 110, and controls the second electromagnetic clutch 235b so as to cut off transmission between the eighth shaft 234d and the seventh shaft 234c. Thereafter, when the first certain period of time defined in advance has elapsed, or when a subsequent document is conveyed in step S103, the CPU 160 controls the second electromagnetic clutch 235b to connect the eighth shaft 234d to the seventh shaft 234c again.

Likewise, when the document is conveyed in step S103, the CPU 160 controls the first electromagnetic clutch 235a so as to connect the sixth shaft 234b to the fifth shaft 234a. The CPU 160 receives the second conveying amount signal from the second encoder 202, and monitors the state of the second encoder 202. When the CPU 160 detects that the conveying amount of the document is equal to or less than the threshold value based on the second conveying amount signal, the CPU 160 determines that the rear edge of the document has passed the pick roller 111, and controls the first electromagnetic clutch 235a so as to cut off transmission between the sixth shaft 234b and the fifth shaft 234a. Thereafter, when the second certain period of time defined in advance has elapsed or when a subsequent document is conveyed in step S103, the CPU 160 controls the first electromagnetic clutch 235a to connect the sixth shaft 234b to the fifth shaft 234a again.

As described above in detail, the document conveying apparatus 200 is able to properly control the rotation of each roller even when the electromagnetic clutches are used as the blocking mechanism.

According to the document conveying apparatus, in a document conveying apparatus driving a separation roller and multiple conveying rollers for conveying a document stacked on a document tray with a single driving force generation module, the rotation of each roller can be properly controlled.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A document conveying apparatus comprising:
   a document tray;
   a driving module for generating a first driving force;
   a first conveying roller for conveying a document stacked at a lowermost position, which is one of a plurality of documents stacked on the document tray;
   a second conveying roller, provided at a downstream side with respect to the first conveying roller in a document conveying direction for conveying said document stacked at the lowermost position;
   a separation roller provided at the downstream side with respect to the second conveying roller in the document conveying direction for separating the document from the plurality of stacked documents;
   a driving force transmission mechanism for transmitting the first driving force to a driving shaft of the first conveying roller, a driving shaft of the second conveying roller, and a driving shaft of the separation roller;
   a first blocking mechanism provided between the first conveying roller and the driving shaft of the first conveying roller for blocking a second driving force transmitted to the first conveying roller by the driving shaft of the first conveying roller so that the second driving force is not transmitted to the first conveying roller, after a rear edge of the document conveyed by the first conveying roller passes the first conveying roller and a next document to be subsequently conveyed comes into contact with the first conveying roller; and
   a third conveying roller provided at the downstream side with respect to the separation roller in the document conveying direction, wherein
   a period of time for blocking the second driving force is set to be equal to or less than a period of time for conveying the document for a distance between the separation roller and the third conveying roller.

2. The document conveying apparatus according to claim 1, wherein
   the separation roller is configured to convey a document conveyed by the first conveying roller by a conveying speed faster than a conveying speed by the first conveying roller, and wherein
   the first blocking mechanism blocks a second driving force so that the second driving force is not transmitted to the first conveying roller, after a rear edge of the document conveyed by the first conveying roller passes the first conveying roller and a next document to be subsequently conveyed comes into contact with the first conveying roller, by causing the document conveyed by the separation roller rotate the first conveying roller faster than the driving shaft of the first conveying roller.

3. The document conveying apparatus according to claim 1, wherein a conveying speed by the first conveying roller is set to be slower than a conveying speed by the separation roller.

4. The document conveying apparatus according to claim 1, wherein a conveying speed by the second conveying roller is set to be faster than the conveying speed by the first conveying roller, and slower than the conveying speed by the separation roller.

5. The document conveying apparatus according to claim 1, wherein the first blocking mechanism includes a first cam member including a first space in which a first member rotating in synchronization with the driving shaft of the first conveying roller can rotate, and a first contact portion provided in the first space, and wherein
   the first cam member is fixed to the first conveying roller, and wherein
   the first blocking mechanism blocks the second driving force so that the second driving force is not transmitted to the first conveying roller, while the first member rotates in the first space until the first member comes into contact with the first contact portion.

6. The document conveying apparatus according to claim 1, further comprising a second blocking mechanism, provided between the second conveying roller and the driving shaft of the second conveying roller, for blocking a third driving force transmitted to the second conveying roller by the driving shaft of the second conveying roller so that the third driving force is not transmitted to the second conveying roller, after a rear edge of the document conveyed by the second conveying roller passes the second conveying roller, and the next document to be subsequently conveyed comes into contact with the second conveying roller.

7. The document conveying apparatus according to claim 6, wherein the second blocking mechanism includes a second cam member including a second space in which a second member rotating in synchronization with the driving shaft of the second conveying roller can rotate, and a second contact portion provided in the second space, wherein the second cam member is fixed to the second conveying roller, and wherein the second blocking mechanism blocks the third driving force so that the third driving force is not transmitted to the second conveying roller, while the second member rotates in the second space until the second member comes into contact with the second contact portion.

\* \* \* \* \*

UNITED STATES PATENT AND TRADEMARK OFFICE
CERTIFICATE OF CORRECTION

PATENT NO. : 10,200,553 B2  
APPLICATION NO. : 15/497751  
DATED : February 5, 2019  
INVENTOR(S) : Takayuki Umi Page 1 of 1

It is certified that error appears in the above-identified patent and that said Letters Patent is hereby corrected as shown below:

In the Claims  
Column 20, Lines 53-54 (approx.), Claim 4     delete "claim 1," and  
insert -- claim 3, --

Signed and Sealed this  
Twelfth Day of May, 2020

Andrei Iancu  
*Director of the United States Patent and Trademark Office*